US012764609B2

(12) United States Patent
He et al.

(10) Patent No.: US 12,764,609 B2
(45) Date of Patent: Oct. 13, 2026

(54) DATA TRANSMISSION THROUGH THE PROTOCOL DATA UNIT SESSION BASED ON DATA ROUTING POLICY

(71) Applicant: HUAWEI TECHNOLOGIES CO., LTD., Shenzhen (CN)

(72) Inventors: Qingchun He, Shenzhen (CN); Youyang Yu, Shanghai (CN); Mingchao Li, Beijing (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 291 days.

(21) Appl. No.: 18/627,523

(22) Filed: Apr. 5, 2024

(65) Prior Publication Data

US 2024/0251300 A1 Jul. 25, 2024

Related U.S. Application Data

(63) Continuation of application No. PCT/CN2022/121385, filed on Sep. 26, 2022.

(30) Foreign Application Priority Data

Oct. 8, 2021 (CN) .......................... 202111179354.3

(51) Int. Cl.
*H04W 28/24* (2009.01)
*H04W 76/10* (2018.01)

(52) U.S. Cl.
CPC ........... *H04W 28/24* (2013.01); *H04W 76/10* (2018.02)

(58) Field of Classification Search
CPC ..... H04W 28/24; H04W 76/10; H04W 47/18; H04W 48/16; H04W 76/15; H04W 76/11; H04W 76/27; H04W 76/41; H04W 76/30
See application file for complete search history.

(56) References Cited

U.S. PATENT DOCUMENTS

2021/0352741 A1* 11/2021 Mo .......................... H04L 5/001
2021/0360616 A1* 11/2021 Yi .......................... H04L 5/0012

(Continued)

FOREIGN PATENT DOCUMENTS

CN 108632953 A * 10/2018 ............ H04W 48/16
EP 3755117 A1 * 12/2020 ............ H04W 76/15
WO WO-2018062949 A1 * 4/2018 ............ H04W 76/15

OTHER PUBLICATIONS

International Search Report and Written Opinion issued in PCT/CN2022/121385, dated Dec. 21, 2022, 10 pages.

(Continued)

*Primary Examiner* — Mewale A Ambaye

(57) ABSTRACT

A communication method, apparatus, and system are disclosed. The method includes: receiving first information from a first node, where the first information is used to request to establish a first protocol data unit (PDU) session; sending second information to the first node, where the second information indicates an identifier of the first PDU session and a first quality of service (QoS) configuration policy corresponding to the first PDU session; and sending third information to the first node, where the third information indicates a data routing policy corresponding to the first PDU session, and the data routing policy includes session information of the first PDU session. In the method, a second node can configure a PDU session for the first node, so that a service provided by a core network can better meet a requirement of a terminal that does not support NAS signaling transmission.

18 Claims, 9 Drawing Sheets

(56) References Cited

U.S. PATENT DOCUMENTS

| | | | | |
|---|---|---|---|---|
| 2023/0039103 | A1* | 2/2023 | Khoshnevisan | H04W 52/54 |
| 2023/0073391 | A1* | 3/2023 | Xiong | H04W 36/0044 |
| 2024/0015569 | A1* | 1/2024 | Doostnejad | H04L 47/24 |
| 2024/0251300 | A1* | 7/2024 | He | H04W 76/10 |

OTHER PUBLICATIONS

Extended European Search Report issued in EP22877871.8, dated Dec. 4, 2024, 10 pages.

* cited by examiner

DATA TRANSMISSION THROUGH THE PROTOCOL DATA UNIT SESSION BASED ON DATA ROUTING POLICY

CROSS-REFERENCE TO RELATED APPLICATIONS

This application is a continuation of International Application No. PCT/CN2022/121385, filed on Sep. 26, 2022, which claims priority to Chinese Patent Application No. 202111179354.3, filed on Oct. 8, 2021. The disclosures of the aforementioned applications are hereby incorporated by reference in their entireties.

TECHNICAL FIELD

Embodiments of this application relate to the field of communication technologies, and in particular, to a communication method, apparatus, and system.

BACKGROUND

Different communication systems are often converged, to complement advantages of each other. For example, in a short-range communication system, a communication distance is limited, but power consumption of a terminal and costs are low. In the 5th generation (5G) cellular network communication system, macro coverage can be provided, a communication range is wide, but power consumption of a terminal and costs are high. In view of this, the short-range communication system and the 5G cellular network communication system may be converged, so that a converged communication system can implement long-range transmission with low power consumption and low costs.

However, because some short-range terminals do not support NAS signaling transmission, the terminals need to access a cellular network through another short-range node (for example, a management node or a gateway node), to indirectly enjoy a service provided by a 5G core network.

SUMMARY

Embodiments of this application provide a communication method, apparatus, and system, to better meet the requirement of a terminal device that does not support NAS signaling transmission.

According to a first aspect, an embodiment of this application provides a communication method, which may be used in a second node. The method includes:

receiving first information from a first node, where the first information is used to request to establish a first protocol data unit (PDU) session; sending second information to the first node, where the second information indicates an identifier of the first PDU session and a first quality of service (QoS) configuration policy corresponding to the first PDU session; and sending third information to the first node, where the third information indicates a data routing policy corresponding to the first PDU session, and the data routing policy includes session information of the first PDU session.

According to the foregoing method, in embodiments of this application, the second node can configure a PDU session for the first node based on a requirement of the first node, so that a service provided by a core network can better meet the requirement of a terminal that does not support NAS signaling transmission.

In a possible implementation, the first QoS configuration policy may include a correspondence between the first PDU session and at least one session parameter included in the first information.

It should be noted that, in embodiments of this application, that the first QoS configuration policy includes the correspondence between the first PDU session and the at least one session parameter does not mean that the first QoS configuration policy actually includes a correspondence between one first PDU session and the at least one session parameter, but may be understood as that because the first QoS configuration policy is associated with the first PDU session and is a PDU session established based on the first information, the first QoS configuration policy may include the correspondence between the first PDU session and the at least one session parameter included in the first information.

In a possible implementation, the method includes performing, based on the data routing policy, data transmission through the first PDU session.

In a possible implementation, the first QoS configuration policy includes one or more of the following mapping relationships: a mapping relationship between a service flow identifier QFI and a differentiated service code point (DSCP) of data, a mapping relationship between a DSCP and a quality of service identifier (XQI), or a mapping relationship between an XQI and a QoS parameter.

According to the foregoing method, this application provides content included in the first QoS configuration policy.

In a possible implementation, the data routing policy includes one or more of a number of QoS flows included in the first PDU session, a mapping manner of the first PDU session, a number of first nodes included in the first PDU session, or a type of mapping between the QoS flow and the first node.

According to the foregoing method, this application provides content included in the data routing policy.

In a possible implementation, the second information further indicates a QoS short-range control policy of the first node; and the QoS short-range control policy of the first node includes a mapping relationship between a differentiated service code point (DSCP) and a transmission channel identifier (TCID) or a mapping relationship between a TCID and both a DSCP and an internet protocol version 6 (IPv6) flow label.

According to the foregoing method, this application provides another indication function of the second information. For example, the second information further indicates the QoS short-range control policy of the first node, so that a corresponding TCID to which transmitted data needs to be mapped can be determined based on the second information.

In a possible implementation, the method includes: receiving fourth information from a third node, where the fourth information indicates a second QoS configuration policy of the first PDU session, and the second QoS configuration policy includes a 5G quality of service indicator 5QI, or the second QoS configuration policy indicates a mapping relationship between a 5QI and a QFI.

It should be noted that, in embodiments of this application, the second QoS configuration policy further indicates a mapping relationship between a 5QI and another session parameter or a mapping relationship between other session parameters, and a mapping relationship indicated by the second QoS configuration policy is not specifically limited to the mapping relationship between a service flow identifier QFI and a differentiated service code point (DSCP) of data, the mapping relationship between a DSCP and a quality of service identifier (XQI), or the mapping relationship between an XQI and a QoS parameter.

According to the foregoing method, the third node delivers the second QoS configuration policy based on the requirement of the first node, and the second node configures a PDU session for the first node based on the second QoS configuration policy delivered by the third node, so that the service provided by the core network can better meet the requirement of the terminal that does not support NAS signaling transmission.

In a possible implementation, the fourth information is carried in a NAS message.

According to the foregoing method, this application provides a manner of sending the fourth information.

In a possible implementation, before the receiving fourth information from a third node, the method further includes: sending first request information, where the first request information is used to request the second QoS configuration policy of the first PDU session.

According to the foregoing method, this application provides a case in which the third node is triggered to send the fourth information.

In a possible implementation, the first request information is carried in a registration request sent to the third node; or after a registration request is sent to the third node and before the first information is received, the first request information is sent. According to the foregoing method, this application provides a plurality of manners of sending the first request information.

In a possible implementation, the first information includes one or more session parameters of the QoS parameter, an application type, a terminal type, a PSK type, and a DNN; the DNN indicates a type of the first PDU session; and the application type indicates a type of a service that the first PDU session is used to transmit or carry.

According to the foregoing method, this application provides content included in the first information.

In a possible implementation, the method further includes: determining that the first node is included in a trustlist of a second node; or determining to establish the first PDU session for the first node.

According to the foregoing method, this application provides a plurality of cases in which the second node is triggered to establish the first PDU session for the first node.

In a possible implementation, the data routing policy indicates to perform data transmission through a first PDU session established based on an IP address of the first node; or the data routing policy indicates to perform data transmission through a first PDU session established based on a MAC address of the first node.

According to the foregoing method, this application provides a plurality of indication functions of the data routing policy.

In a possible implementation, communication with the first node is performed by using a first communication technology; and communication with the third node is performed by using a second communication technology.

According to a second aspect, an embodiment of this application provides a communication method, which may be used in a first node. The method includes:

- sending first information to a second node, where the first information is used to request to establish a first protocol data unit (PDU) session; and
- receiving second information sent by the second node, where the second information indicates an identifier of the first PDU session and a first quality of service (QoS) configuration policy corresponding to the first PDU session, and the first QoS configuration policy includes a correspondence between the first PDU session and at least one session parameter included in the first information; and receiving third information sent by the second node, where the third information indicates a data routing policy corresponding to the first PDU session, and the data routing policy includes session information of the first PDU session.

According to the foregoing method, in embodiments of this application, the second node can configure a PDU session for the first node based on a requirement of the first node, so that a service provided by a core network can better meet a requirement of a terminal that does not support NAS signaling transmission.

In a possible implementation, the method further includes performing, based on the data routing policy, data transmission through the first PDU session.

In a possible implementation, the first QoS configuration policy includes at least one of the following mapping relationships: a mapping relationship between a service flow identifier QFI and a differentiated service code point (DSCP) of data, a mapping relationship between a DSCP and a quality of service identifier (XQI), or a mapping relationship between an XQI and a QoS parameter.

According to the foregoing method, this application provides content included in the first QoS configuration policy.

In a possible implementation, the data routing policy includes one or more of a number of QoS flows included in the first PDU session, a mapping manner of the first PDU session, a number of first nodes included in the first PDU session, or a type of mapping between the QoS flow and the first node.

According to the foregoing method, this application provides content included in the data routing policy.

In a possible implementation, the second information further indicates a QoS short-range control policy of the first node; and the QoS short-range control policy of the first node includes a mapping relationship between a DSCP and a transmission channel identifier TCID or a mapping relationship between a TCID and both a DSCP and an internet protocol version 6 IPv6 flow label.

According to the foregoing method, this application provides another indication function of the second information. For example, the second information further indicates the QoS short-range control policy of the first node, so that a corresponding TCID to which transmitted data needs to be mapped can be determined based on the second information.

In a possible implementation, the first information includes one or more session parameters of the QoS parameter, an application type, a terminal type, a PSK type, and a DNN; the DNN indicates a type of the first PDU session; and the application type indicates a type of a service that the first PDU session is used to transmit or carry.

According to the foregoing method, this application provides content included in the first information.

In a possible implementation, the data routing policy indicates to perform data transmission through a first PDU session established based on an IP address of the first node; or the data routing policy indicates to perform data transmission through a first PDU session established based on a MAC address of the first node.

According to the foregoing method, this application provides a plurality of indication functions of the data routing policy.

In a possible implementation, before the sending first information to a second node, the method further includes: determining that no PDU session meets a current service requirement.

According to the foregoing method, this application provides a case in which the first node is triggered to send the first information.

In a possible implementation, communication with the second node is performed by using a first communication technology; and a service provided by using a second communication technology is obtained through a third node.

According to a third aspect, an embodiment of this application provides a communication method, which may be used in a third node. The method includes:

sending fourth information to a second node, where the fourth information indicates a second quality of service QoS configuration policy of a first PDU session, and the second QoS configuration policy includes a 5G quality of service indicator 5QI, or the second QoS configuration policy indicates a mapping relationship between a 5QI and a service flow identifier QFI.

According to the foregoing method, in embodiments of this application, the third node delivers the second QoS configuration policy based on a requirement of a first node, and the second node configures a PDU session for the first node based on the second QoS configuration policy delivered by the third node, so that a service provided by a core network can better meet a requirement of a terminal that does not support NAS signaling transmission.

In a possible implementation, the fourth information is carried in a NAS message.

According to the foregoing method, this application provides a manner of sending the fourth information.

In a possible implementation, before the sending fourth information to a second node, the method further includes receiving first request information, where the first request information is used to request the second QoS configuration policy of the first PDU session.

According to the foregoing method, this application provides a case in which the third node is triggered to send the fourth information.

In a possible implementation, the first request information is carried in a registration request received from the second node, or the first request information is obtained after a registration request is received from the second node.

According to the foregoing method, this application provides a plurality of manners of sending the first request information.

In a possible implementation, communication with the second node is performed by using a second communication technology; and a service is provided, by using the second communication technology, for a first node that uses a first communication technology.

According to a fourth aspect, an embodiment of this application provides a communication apparatus. The apparatus is configured to implement the method according to any one of the first aspect or the possible implementations of the first aspect, and includes corresponding functional modules or units, which are respectively configured to implement the steps in the method according to the first aspect. Functions may be implemented by hardware, or may be implemented by hardware by executing corresponding software. The hardware or the software includes one or more modules or units corresponding to the foregoing function.

According to a fifth aspect, an embodiment of this application provides a communication apparatus. The apparatus is configured to implement the method according to any one of the second aspect or the possible implementations of the second aspect, and includes corresponding functional modules or units, which are respectively configured to implement the steps in the method according to the second aspect. Functions may be implemented by hardware, or may be implemented by hardware by executing corresponding software. The hardware or the software includes one or more modules or units corresponding to the foregoing function.

According to a sixth aspect, an embodiment of this application provides a communication apparatus. The apparatus is configured to implement the method according to any one of the third aspect or the possible implementations of the third aspect, and includes corresponding functional modules or units, which are respectively configured to implement the steps in the method according to the third aspect. Functions may be implemented by hardware, or may be implemented by hardware by executing corresponding software. The hardware or the software includes one or more modules or units corresponding to the foregoing function.

According to a seventh aspect, a communication apparatus is provided. The apparatus includes a processor and a memory. The memory is configured to store a computer program or instructions, and the processor is coupled to the memory. When the processor executes the computer program or the instructions, the apparatus is enabled to perform the method according to any one of the first aspect or the possible implementations of the first aspect. The communication apparatus may be a first apparatus or an apparatus that can support a first apparatus in implementing functions required for the method provided in the first aspect, for example, a chip system. For example, the communication apparatus may be a terminal device or some components (for example, a chip) in a terminal device. For example, the terminal device may be an intelligent mobile terminal, a smart home device, an intelligent vehicle, or an intelligent wearable device. For example, the intelligent mobile terminal is a mobile phone, a tablet computer, a notebook computer, an ultra-mobile personal computer (UMPC), a netbook computer, or a personal digital assistant (PDA). For example, the smart home device is a smart refrigerator, a smart washing machine, a smart television, or a smart speaker. For example, the intelligent vehicle wearable device is a smart headset, smart glasses, smart clothing, or smart shoes.

According to an eighth aspect, a communication apparatus is provided. The apparatus includes a processor and a memory. The memory is configured to store a computer program or instructions, and the processor is coupled to the memory. When the processor executes the computer program or the instructions, the apparatus is enabled to perform the method according to any one of the second aspect or the possible implementations of the second aspect. The communication apparatus may be a second apparatus or an apparatus that can support a second apparatus in implementing functions required for the method provided in the second aspect, for example, a chip system. For example, the communication apparatus may be a terminal device or some components (for example, a chip) in a terminal device. For example, the terminal device may be an intelligent mobile terminal, a smart home device, an intelligent vehicle, or an intelligent wearable device. For example, the intelligent mobile terminal is a mobile phone, a tablet computer, a notebook computer, an ultra-mobile personal computer (UMPC), a netbook computer, or a personal digital assistant (PDA). For example, the smart home device is a smart refrigerator, a smart washing machine, a smart television, or a smart speaker. For example, the intelligent vehicle wearable device is a smart headset, smart glasses, smart clothing, or smart shoes.

According to a ninth aspect, a communication apparatus is provided. The apparatus includes a processor and a memory. The memory is configured to store a computer program or instructions, and the processor is coupled to the memory. When the processor executes the computer program or the instructions, the apparatus is enabled to perform the method according to any one of the third aspect or the possible implementations of the third aspect. The communication apparatus may be a third apparatus or an apparatus that can support a third apparatus in implementing functions required for the method provided in the third aspect, for example, a chip system. For example, the communication apparatus may be a terminal device or some components (for example, a chip) in a terminal device. For example, the terminal device may be an intelligent mobile terminal, a smart home device, an intelligent vehicle, or an intelligent wearable device. For example, the intelligent mobile terminal is a mobile phone, a tablet computer, a notebook computer, an ultra-mobile personal computer (UMPC), a netbook computer, or a personal digital assistant (PDA). For example, the smart home device is a smart refrigerator, a smart washing machine, a smart television, or a smart speaker. For example, the intelligent vehicle wearable device is a smart headset, smart glasses, smart clothing, or smart shoes.

According to a tenth aspect, a terminal is provided. The terminal may include the apparatus in the fourth aspect or the seventh aspect and the apparatus in the fifth aspect or the eighth aspect. Optionally, the apparatus may be a smart home device, an intelligent manufacturing device, an intelligent transportation device, or the like, for example, a vehicle, an uncrewed aerial vehicle, an automobile and a vehicle, or a robot. Alternatively, the apparatus may be a mouse, a keyboard, a wearable device, a TWS headset, or the like.

According to an eleventh aspect, this application provides a chip, where the chip is connected to a memory, and is configured to: read and execute a computer program or instructions stored in the memory, to implement the method according to any one of the first aspect or the possible implementations of the first aspect; and implement the method according to any one of the second aspect or the possible implementations of the second aspect; or implement the method according to any one of the third aspect or the possible implementations of the third aspect.

According to a twelfth aspect, a computer-readable storage medium is provided, where the computer-readable storage medium stores a computer program or instructions, and when the computer program or the instructions are executed by an apparatus, the apparatus is enabled to perform the method according to any one of the first aspect or the possible implementations of the first aspect, or the apparatus is enabled to perform the method according to any one of the second aspect or the possible implementations of the second aspect, or the apparatus is enabled to perform the method according to any one of the third aspect or the possible implementations of the third aspect.

According to a thirteenth aspect, this application provides a computer program product, where the computer program product includes a computer program or instructions, and when the computer program or the instructions are executed by an apparatus, the apparatus is enabled to perform the method according to any one of the first aspect or the possible implementations of the first aspect, or the apparatus is enabled to perform the method according to any one of the second aspect or the possible implementations of the second aspect, or the apparatus is enabled to perform the method according to any one of the third aspect or the possible implementations of the third aspect.

It should be understood that the technical solutions provided in this application may be applied to a scenario in which different communication systems are converged, so that a service provided by a core network in a converged communication scenario of the different communication systems can effectively meet the requirement of the terminal that does not support NAS signaling transmission.

DESCRIPTION OF EMBODIMENTS

Embodiments of this application provide a communication method and apparatus, so that a service indirectly provided by a 5G network for a T node can meet a requirement of a terminal node that does not support a NAS. To make the objectives, technical solutions, and advantages of embodiments of this application clearer, the following further describes embodiments of this application in detail with reference to the accompanying drawings.

The communication method provided in embodiments of this application may be applied to a 5th generation (5G) communication system, for example, a 5G new radio (NR), or may be applied to various future communication systems, for example, a 6th generation (6G) communication system. This is not limited herein.

Figure 1:
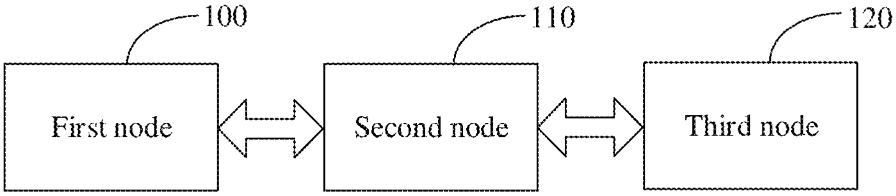
FIG. 1 is a schematic diagram of an example first communication system according to an embodiment of this application.

As shown in FIG. 1, an embodiment of this application provides an architecture of an example communication system to which the communication method is applicable.

The communication system may include a first node 100, a second node 110, and a third node 120. Optionally, in the communication system, the first node may be connected to the second node, and the second node may be connected to the third node.

In this application, the communication system may be a communication system obtained by converging different communication systems, for example, a communication system obtained by converging a short-range wireless communication system and a 5G cellular network communication system. This is not limited herein. The converged communication system may also be referred to as a tight interworking communication system or an interworking communication system.

For example, in this application, the converged communication system is described by using the communication system obtained by converging the short-range wireless communication system and the 5G cellular network communication system as an example.

In the converged communication system, a terminal node supporting short-range wireless communication may access a 5G network by using a control node or a gateway node, and further use a service provided by the 5G network. In addition, the 5G network may perform data transmission policy configuration and management on the terminal node based on subscription information and link status information of the terminal node, to provide a refined service. In other words, in the converged communication system, the short-range wireless communication system and the 5G cellular network communication system may work interactively to complement advantages of each other.

Optionally, the short-range wireless communication system described in this application may be any possible short-range communication system, for example, Bluetooth, Wi-Fi, a vehicle-mounted universal short-range communication system, and a short-range communication system that is likely to emerge now and in the future, for example, SparkLink. Compared with a 5G communication system, a short-range communication system has a small coverage area and a short communication distance. A specific communication distance or coverage area of the short-range communication system is not specifically limited in this application, and a short communication distance for the 5G communication system is used.

In embodiments of this application, the first node is a node (for example, a T node) for applying for a service, and may be a terminal device or a communication apparatus that can support a terminal device in implementing a function required by the method, or may be a network device or a communication apparatus that can support a network device in implementing a function required by the method. Certainly, the first node may alternatively be another communication apparatus, for example, a chip system.

In embodiments of this application, the second node is a node (for example, a G node) for authorizing and authenticating the first node, and may be a network device or a communication apparatus that can support a network device in implementing a function required by the method, or may be a terminal device or a communication apparatus that can support a terminal device in implementing a function required by the method. Certainly, the second node may alternatively be another communication apparatus, for example, a chip system.

In embodiments of this application, the third node is a node (for example, a core network node) for providing a service for the first node, and may be a network device or a communication apparatus that can support a network device in implementing a function required by the method, for example, an access and mobility management function (AMF), or may be a terminal device or a communication apparatus that can support a terminal device in implementing a function required by the method. Certainly, the third node may alternatively be another communication apparatus, for example, a chip system.

Optionally, the terminal device in embodiments of this application may be a device for implementing a wireless communication function, for example, a terminal or a chip that may be used in a terminal. For example, a handheld device with a wireless connection function or a processing device connected to a wireless modem may be included. The terminal device may communicate with a core network through a radio access network (RAN), and exchange a voice and/or data with the RAN. The terminal device may include user equipment (UE), a wireless terminal device, a mobile terminal device, a subscriber unit, a subscriber station, a mobile station, a mobile console (mobile), a remote station, an access point (AP), a remote terminal, an access terminal, a user terminal, a user agent, a user device, or the like. For example, the terminal device may include a mobile phone (or referred to as a "cellular" phone), a computer with a mobile terminal device, a portable, pocket-sized, handheld, computer built-in, or vehicle-mounted mobile apparatus, or an intelligent wearing device. For example, the terminal device may be a device, for example, a personal communication service (PCS) phone, a cordless telephone set, a session initiation protocol (SIP) phone, a wireless local loop (WLL) station, or a personal digital assistant (PDA). The terminal device may further include a limited device, for example, a device with low power consumption, a device with a limited storage capability, or a device with a limited computing capability. For example, the terminal device includes an information sensing device, for example, a barcode, radio frequency identification (RFID), a sensor, a global positioning system (GPS), or a laser scanner.

By way of example, and not limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or some of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

Optionally, the network device in embodiments of this application may include an access network (AN) device and a radio access network (RAN) device. The access network device, for example, a base station (for example, an access point), may be a device that communicates with a wireless terminal device over an air interface in an access network by using one or more cells. The base station may be configured to mutually convert a received over-the-air frame and an internet protocol (IP) packet, and serve as a router between the terminal device and other parts of the access network, where the other parts of the access network may include an IP network. The network side device may further coordinate attribute management of the air interface. For example, the network device may include an evolved NodeB (NodeB, eNB, or e-NodeB) in a long term evolution (LTE) system or a long term evolution-advanced (LTE-A) system; may include a next generation NodeB (gNB), a next generation evolved NodeB (ng-eNB), or an enhanced next generation NodeB (en-gNB) in a 5th generation (5G) mobile communication technology new radio (NR) system; may include a central unit (CU) and a distributed unit (DU) in a cloud radio access network (Cloud RAN) system; or may further include a relay device. This is not limited in embodiments of this application.

Figure 2:
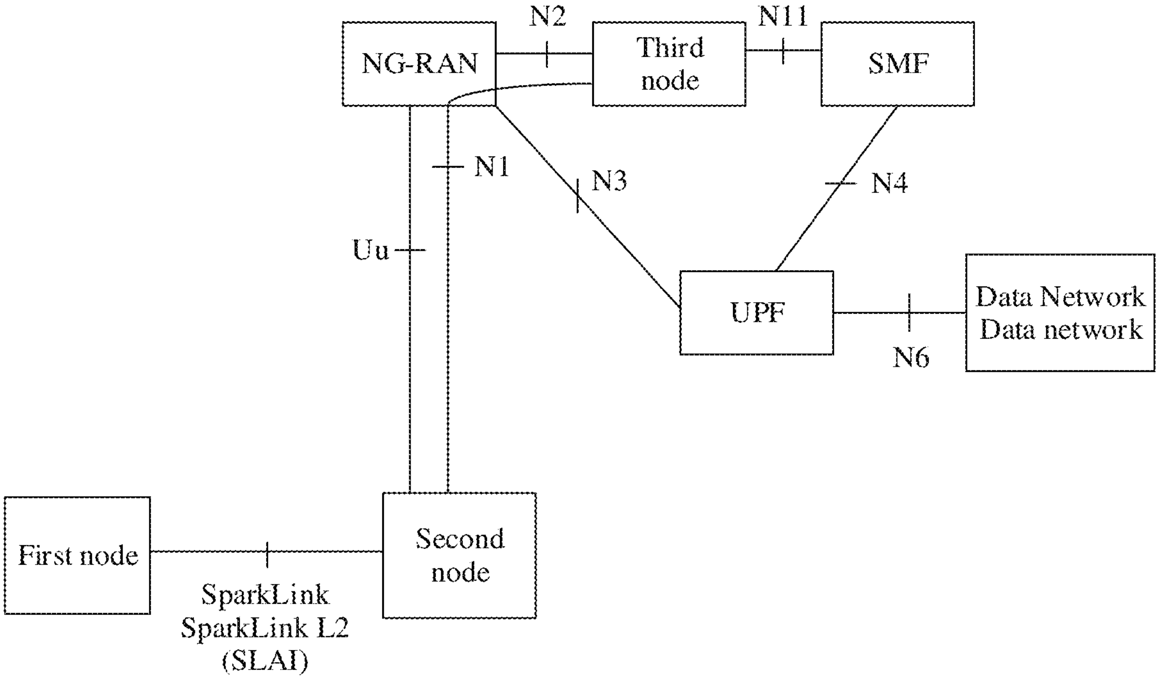
FIG. 2 is a schematic diagram of an example second communication system according to an embodiment of this application.

In addition, this application further provides another communication system. As shown in FIG. 2, the communication system may further include functional entities such as a session management function (SMF), a user plane function (UPF), and a DN.

Functions may be connected through an interface. A sequence number of an interface or a name of an interface is not limited in embodiments of this application. An interface defined in a 3GPP-related standard protocol of a 5G system may be used, or an interface in a future communication system may be used. For example, the terminal device communicates with an AMF through a next generation (next generation, N) 1 interface (briefly referred to as N1), the network device communicates with the AMF through an N2 interface (briefly referred to as N2), the network device communicates with a local UPF through an N3 interface (briefly referred to as N3), and the UPF communicates with the DN through an N6 interface (briefly referred to as N6). The AMF communicates with the SMF through an N11 interface (briefly referred to as N11), and the SMF communicates with the UPF through the N4 interface (briefly referred to as N4).

Functions included in the communication system may also be referred to as functional entities, network elements, or other names. For example, the SMF may be referred to as an SMF entity. Optionally, functions in embodiments of this application may be implemented by one device, or may be jointly implemented by a plurality of devices, or may be implemented by one or more functional modules in one device. This is not specifically limited in embodiments of this application. It may be understood that the functions in embodiments of this application may be a network element in a hardware device, a software function running on dedicated hardware, a combination of hardware and software, or a virtualization function instantiated on a platform (for example, a cloud platform).

It should be noted that a distribution form of the functions is not limited in embodiments of this application. Optionally, the functions may also include another functional entity formed by converging any plurality of functions, for example, a functional entity having two functions of session management and policy control, a functional entity having three functions of session management, access and mobility management, and policy control, or a functional entity having two functions of network openness and application function.

It should be noted that the communication system shown in FIG. 1 and FIG. 2 does not constitute a limitation on a communication system to which embodiments of this application are applicable. Certainly, a number of terminal devices in FIG. 2 is merely an example. During actual application, the network device may serve a plurality of terminal devices. The network device and all or some of the plurality of terminal devices each may determine a scheduling limitation according to a method provided in embodiments of this application. The communication system architecture shown in FIG. 1 and/or FIG. 2 may be a non-roaming 5G system architecture. Optionally, the method in embodiments of this application is further applicable to a roaming 5G system architecture and various future communication networks.

Functions and devices in embodiments of this application may also be referred to as communication apparatuses, and each may be a general-purpose device or a dedicated device. This is not specifically limited in embodiments of this application.

The foregoing describes an application architecture in embodiments of this application. The following describes technical features in embodiments of this application.

Currently, in a communication transmission process of the converged communication system, a service provided by the core network usually cannot meet a requirement of a terminal that does not support NAS signaling transmission. In view of this, embodiments of this application provide a communication method, so that a service provided by a core network better meets a requirement of a terminal that does not support NAS signaling transmission. The method and the apparatus are based on a same technical concept. Because problem-resolving principles of the method and the device are similar, mutual reference may be made to implementation of the device and the method.

Figure 3:
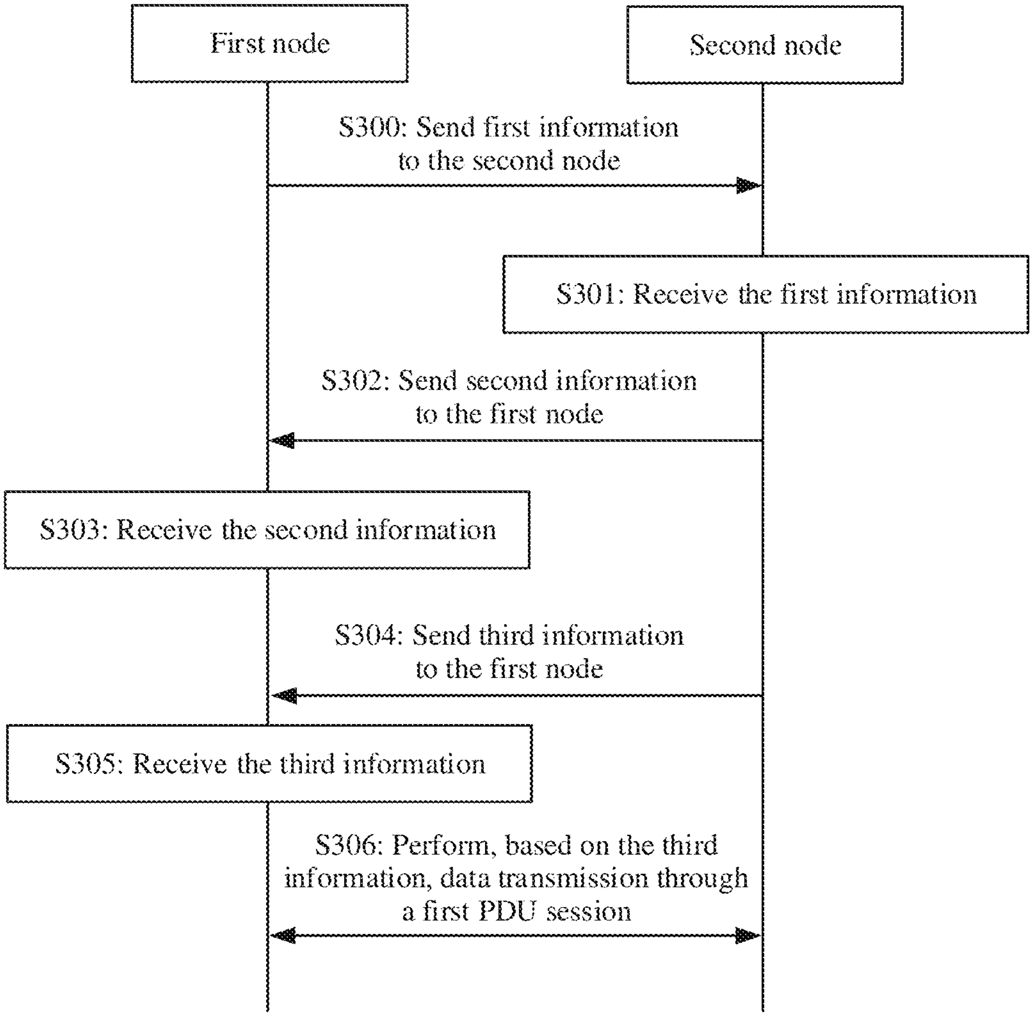
FIG. 3 is a schematic flowchart of an example first communication method according to an embodiment of this application.

An embodiment of this application provides a first communication method. FIG. 3 is a flowchart of the method.

S300: A first node sends first information to a second node, where the first information is used to request to establish a first protocol data unit (PDU) session.

Optionally, the first information may be a first PDU session establishment request.

Specifically, in embodiments of this application, the first information may include one or more session parameters of a quality of service (QoS) parameter, an application type, a terminal type, a pre-shared key (PSK) type, and a data network name (DNN).

The QoS parameter in embodiments of this application may be a 5G converged QoS parameter, and includes one or more of code, a port number, a priority, a delay, a packet loss rate, a throughput rate, a guard bit rate (GBR), a non-guard bit rate (NGBR), a maximum flow bit rate (MFBR), an allocation and retention priority (ARP), fifth generation communication system core network (5GC) notification control (the 5GC is notified when QoS does not meet a requirement), and short-range notification control (a peer node is notified when QoS does not meet a requirement).

The DNN indicates a type of the first PDU session. For example, the session type is web browsing, the session type is a WeChat service, or the session type is an Alipay service.

The application type indicates a type of a service that the first PDU session is used to transmit or carry. For example, the application type indicates that the type of the service carried by the first PDU session is an audio streaming service, a video streaming service, a periodic service, or an aperiodic service. Alternatively, the application type indicates a delay requirement, a reliability requirement, a throughput requirement, and the like that the first PDU session is used to transmit.

The terminal type indicates a terminal status of the first PDU session. For example, the terminal type is a 5G converged terminal.

The PSK type is used to determine a trustlist filtering mechanism used for the first PDU session. For example, the PSK type is a 5G trusted PSK. It may be understood that, when a PSK type of the first node is the 5G trusted PSK, it may be considered that the first node is in a trustlist; or when a PSK type of the first node is a 5G untrusted PSK, it may be considered that the first node is not in a trustlist.

It should be noted that the trustlist filtering mechanism in embodiments of this application includes but is not limited to the terminal type and the PSK type.

In embodiments of this application, the second node communicates with the first node by using a first communication technology.

It may be understood that, in this application, because the communication system may be a communication system obtained by converging a first communication system and a second communication system, the first communication system and the second communication system are different. For example, in this application, a communication system obtained by converging a short-range wireless communication system (the first communication system) and a 5G cellular network communication system (the second communication system) is used as an example for description.

In the converged communication system, by using the first communication technology, the second node may communicate with the first node located in the short-range wireless communication system, so that the first node that supports short-range wireless communication can access the 5G cellular network communication system via the second node, and further use a service provided by a 5G network. This implements interaction between the short-range wireless communication system and the 5G cellular network communication system, and complements advantages of each other.

It may be understood that, before S300 is performed, the first node determines that no PDU session meets a current service requirement.

For example, if the first node determines that a PDU session meets a requirement, for example, a PDU session that the first node previously requests the second node to establish can meet a current service requirement of an application layer, and in this case, the second node has not notified the first node that the PDU session has been released, it indicates that the PDU session is available, and therefore the first node does not need to send the first information to the second node. Conversely, if the first node determines that no PDU session meets a requirement, the first node sends the first information to the second node.

S301: The second node receives the first information from the first node.

After receiving the first information from the first node in S301, the second node may further determine, based on the first information, whether to establish a new PDU session for the first node.

Specifically, the second node may determine, based on the following two aspects, whether to establish the new PDU session for the first node.

In a first aspect, the second node may determine whether the first node is in the trustlist; and if the second node determines that the first node is in the trustlist, the second node may determine to establish the new PDU session for the first node; or if the second node determines that the first node is not in the trustlist, the second node may determine not to establish the new PDU session for the first node.

For example, the second node may determine, based on a PSK type in the received first information, whether the first node is in the trustlist. For example, when the PSK type is the 5G trusted PSK, it may be considered that the first node is in the trustlist. In this case, the second node may determine to establish the new PDU session for the first node.

In a second aspect, the second node may determine whether a PDU session meets the current service requirement; and if there is the PDU session, the second node may determine not to establish the new PDU session for the first node; or if there is no PDU session, the second node may determine to establish the new PDU session for the first node.

It should be noted that, in embodiments of this application, when the second node may meet the foregoing two aspects, the second node determines to establish the new PDU session; or when the second node meets any one of the foregoing aspects, the second node determines to establish the new PDU session. This is not specifically limited in embodiments of this application.

S302: The second node sends second information to the first node, where the second information indicates an identifier of the first PDU session and a first QoS configuration policy corresponding to the first PDU session.

The first QoS configuration policy includes a correspondence between the first PDU session and at least one session parameter included in the first information.

It should be noted that, in embodiments of this application, that the first QoS configuration policy includes the correspondence between the first PDU session and the at least one session parameter does not mean that the first QoS configuration policy actually includes a correspondence between one first PDU session and the at least one session parameter, but may be understood as that because the first QoS configuration policy is associated with the first PDU session and is a PDU session established based on the first information, the first QoS configuration policy may include the correspondence between the first PDU session and the at least one session parameter included in the first information.

In embodiments of this application, the first QoS configuration policy may include one or more mapping relationships, which are not specifically limited to the following three mapping relationships.

Mapping relationship 1: a mapping relationship between a service flow identifier (QFI) and a differentiated service code point (DSCP).

Mapping relationship 2: a mapping relationship between a DSCP and an XQI.

Mapping relationship 3: a mapping relationship between an XQI and a QoS parameter.

It should be noted that the XQI in embodiments of this application may be a quality of service identifier of the short-range wireless communication system. For example, the XQI may be understood as a 5G quality of service indicator (5G QoS Identifier, 5QI) in the 5G cellular communication system.

Optionally, the second information may be determined by the second node, or the second information is determined by the second node based on received fourth information sent by a third node.

The fourth information indicates a second QoS configuration policy of the first PDU session, and the second QoS configuration policy includes a 5QI, or the second QoS configuration policy indicates a mapping relationship between a 5QI and a QFI.

It should be noted that, in embodiments of this application, the second QoS configuration policy further indicates a mapping relationship between a 5QI and another session parameter or a mapping relationship between other session parameters, and a mapping relationship indicated by the second QoS configuration policy is not specifically limited to the mapping relationship between a service flow identifier QFI and a differentiated service code point (DSCP) of data, the mapping relationship between a DSCP and a quality of service identifier (XQI), or the mapping relationship between an XQI and a QoS parameter.

In addition, the second QoS configuration policy in embodiments of this application may be a QoS flow-based configuration policy, a first PDU session-based configuration policy, a radio access bearer (RAB)-based configuration policy, or the like. This is not limited in embodiments of this application.

In embodiments of this application, the second node communicates with the third node by using a second communication technology, and the third node may provide, by using the second communication technology, a service for the first node that uses the first communication technology.

It may be understood that, in this application, because the communication system may be the communication system obtained by converging the first communication system and the second communication system, the first communication system and the second communication system are different. For example, in this application, the communication system obtained by converging the short-range wireless communication system (the first communication system) and the 5G cellular network communication system (the second communication system) is used as an example for description.

In the converged communication system, by using the second communication technology, the second node may communicate with the third node located in the 5G cellular network communication system, so that the third node that supports 5G cellular network communication can provide a 5G network service for the first node that supports short-range wireless communication. This implements interaction between the short-range wireless communication system and the 5G cellular network communication system, and complements advantages of each other.

Optionally, when the second information is determined by the second node based on the received fourth information sent by the third node, the fourth information may be carried in a non-access stratum (NAS) message.

For example, the second node receives a NAS message from the third node. The NAS message carries the fourth information, so that the second node that receives the NAS message can determine the second information based on the fourth information carried in the NAS message.

Further, in embodiments of this application, before sending the fourth information to the second node, the third node receives first request information, where the first request information is used to request the second QoS configuration policy of the first PDU session.

In embodiments of this application, the first request information may be carried in a registration request received from the second node, or the first request information is obtained after a registration request is received from the second node.

Further, in embodiments of this application, the second information may indicate a QoS short-range control policy of the first node.

The QoS short-range control policy of the first node may include a mapping relationship between a DSCP and a transmission channel identifier (TCID) or a mapping relationship between a TCID and both a DSCP and an IPv6 flow label.

For example, a SparkLink short-range QoS mapping configuration procedure is used in this application. The second node may configure a QoS policy related to short-range communication for the first node based on a channel mapping configuration message. For example, the second node may send a mapping configuration between an IP flow and a transmission channel to the first node. The mapping configuration may be based on the mapping between a DSCP and a TCID, the mapping between a TCID and both a DSCP and an IPv6 flow label, and the like. This is not limited herein.

Then, based on the QoS policy, the first node maps an original IP data flow to a corresponding TCID for transmission. In addition, after receiving the mapping configuration between an IP flow and a transmission channel sent by the second node, the first node may further send an acknowledgment of the mapping configuration between an IP flow and a transmission channel to the second node.

A same TCID may carry data of different PDU sessions.

It may be understood that, when the first node and the second node perform IP transmission, a priority of an IP data packet may be determined based on the DSCP and/or the IPv6 flow label. Then, when the IP data packet is mapped to a transmission channel TCID, IP data may be mapped to a corresponding TCID by referring to the mapping relationship between a TCID and a DSCP and/or an IPv6 flow label.

It should be noted that a PDU session may not be considered in the mapping relationship between a DSCP and a TCID or the mapping relationship between a TCID and both a DSCP and an IPv6 flow label included in the QoS short-range control policy of the first node, that is, different PDU sessions may be transmitted on a same TCID.

S303: The first node receives the second information sent by the second node.

S304: The second node sends third information to the first node, where the third information indicates a data routing policy corresponding to the first PDU session.

Specifically, the data routing policy includes session information of the first PDU session. The session information may be understood as information related to the first PDU session.

Optionally, the data routing policy may include one or more types of information, and the session information is not specifically limited to one or more of the following four types of information:

Information 1: a number of QoS flows included in the first PDU session.

Information 2: a mapping manner of the first PDU session.

Optionally, when the mapping manner of the first PDU session included in the data routing policy is a mapping relationship between a PDU session and an internet protocol (IP) address, the data routing policy may indicate to perform data transmission through a first PDU session established based on an IP address of the first node.

Optionally, when the mapping manner of the first PDU session included in the data routing policy is a mapping relationship between a media access control (MAC) address and a PDU session, the data routing policy may indicate to perform data transmission through a first PDU session established based on a MAC address of the first node.

Optionally, when the mapping manner of the first PDU session included in the data routing policy is a mapping relationship between a port number and a PDU session, the data routing policy may indicate to perform data transmission through a first PDU session established based on a port number of the first node.

Information 3: a number of first nodes included in the first PDU session.

Information 4: a type of mapping between the QoS flow and the first node.

The type of mapping in embodiments of this application may be a one-to-one mapping, a one-to-many mapping, or a many-to-many mapping.

S305: The first node receives the third information sent by the second node.

S306: The first node and the second node perform, based on the data routing policy, data transmission through the first PDU session.

It should be noted that, in embodiments of this application, when the first node and the second node perform the communication method, the first node and the second node are in a connected state.

According to the foregoing method, in embodiments of this application, the second node can configure a PDU session for the first node based on a requirement of the first node, so that a service provided by a core network can better meet a requirement of a terminal that does not support NAS signaling transmission.

To better describe the communication method provided in this application, the communication method is further described in detail based on content shown in FIG. 3 and with reference to the following two scenarios. Some steps in the following scenarios may be optional, and a step sequence does not represent an actual execution sequence. Therefore, the following steps and sequences are not limited in this application.

Scenario 1: A second node determines, based on fourth information received from a third node, a QoS policy corresponding to an established first PDU session.

Figure 4:
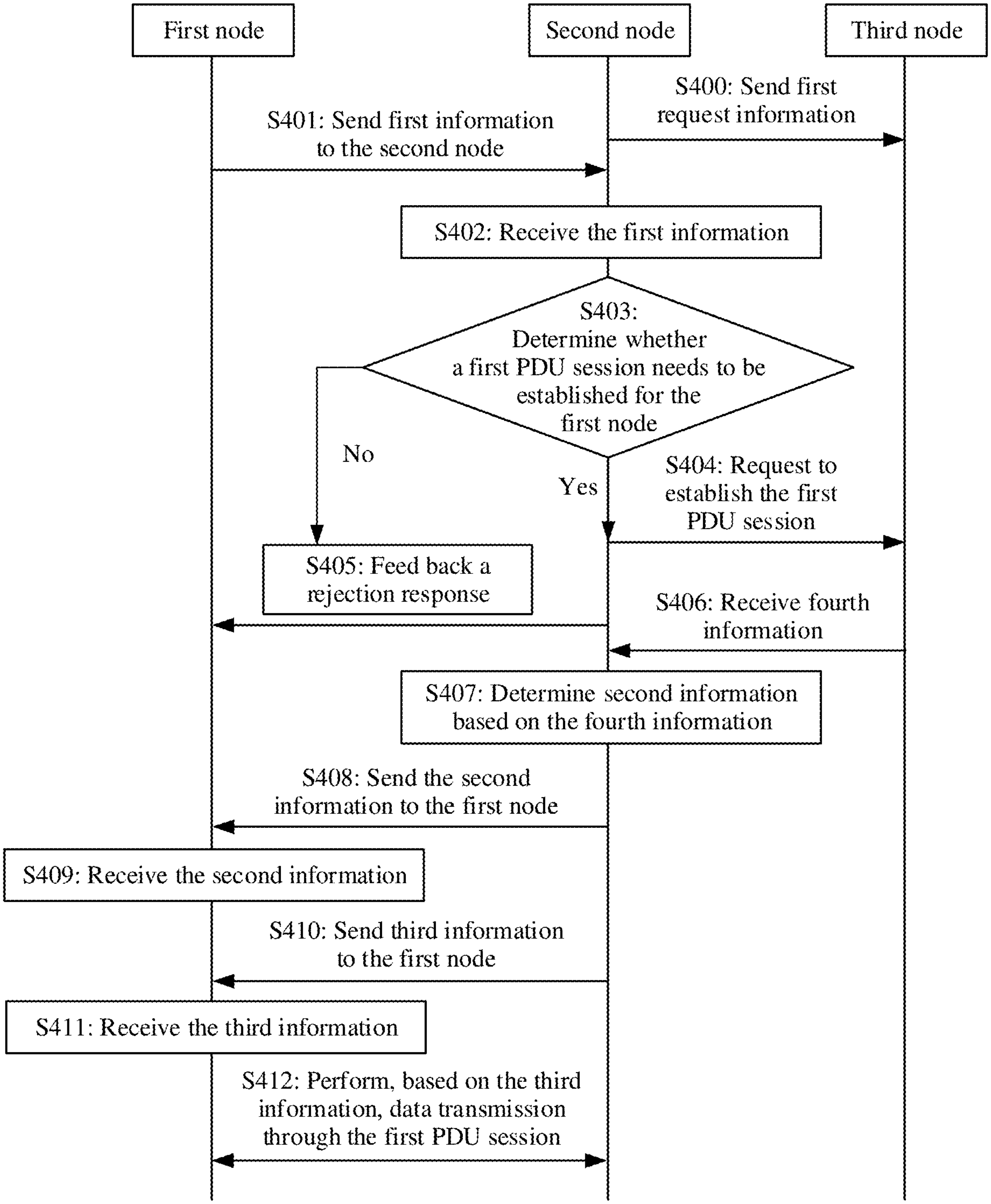
FIG. 4 is a schematic flowchart of an example second communication method according to an embodiment of this application.

As shown in FIG. 4, a method corresponding to the scenario 1 may include the following steps.

S400: The second node sends first request information to the third node, where the first request information is used to request a second QoS configuration policy of the first PDU session.

Optionally, the first request information may be carried in a registration request sent by the second node to the third node. Alternatively, the first request information may be sent by the second node to the third node after the second node sends a registration request to the third node.

S401: A first node sends first information to the second node, where the first information is used to request to establish the first PDU session.

For specific content of S401, refer to descriptions of S300.

S402: The second node receives the first information from the first node.

S403: The second node determines whether the first PDU session needs to be established for the first node, and if the first PDU session needs to be established, performs S404; or if the first PDU session does not need to be established, performs S405.

In S403, the second node may determine, based on the two aspects described in S301, whether to establish the first PDU session for the first node.

S404: The second node requests the third node to establish the first PDU session.

After the second node determines that the first PDU session needs to be established, the second node may convert a related parameter in the first information into a PDU session parameter that can be understood by the third node, and initiate a first PDU session establishment request to the third node.

S405: The second node rejects to establish the first PDU session for the first node, and feeds back a PDU session establishment rejection response to the first node.

S406: The second node receives the fourth information fed back by the third node.

The fourth information indicates the second QoS configuration policy of the first PDU session, and the second QoS configuration policy includes a 5QI, or the second QoS configuration policy indicates a mapping relationship between a 5QI and a QFI.

Optionally, the fourth information may be carried in a first PDU session establishment acceptance response fed back by the third node. Alternatively, after receiving a first PDU session establishment acceptance response fed back by the third node, the second node receives the fourth information sent by the third node.

Optionally, the fourth information may be carried in a NAS message.

The fourth information is determined by the third node based on the first request information received from the second node in S400.

S407: The second node determines second information based on the fourth information, where the second information indicates an identifier of the first PDU session and a first QoS configuration policy corresponding to the first PDU session.

In embodiments of this application, the first QoS configuration policy may include one or more mapping relationships, which are not specifically limited to the following three mapping relationships.

Mapping relationship 1: a mapping relationship between a QFI and a DSCP.

Mapping relationship 2: a mapping relationship between a DSCP and an XQI.

Mapping relationship 3: a mapping relationship between an XQI and a QoS parameter.

It should be noted that the XQI in embodiments of this application may be a quality of service identifier of a short-range wireless communication system. For example, the XQI may be understood as a 5QI in a 5G cellular communication system.

Further, the second node may record and maintain a mapping relationship between the first node and the first PDUI session.

Further, in embodiments of this application, the second information may indicate a QoS short-range control policy of the first node.

The QoS short-range control policy of the first node may include a mapping relationship between a DSCP and a TCID or a mapping relationship between a TCID and both a DSCP and an IPv6 flow label.

For example, when the first node and the second node perform IP transmission, a priority of an IP data packet may be determined based on the DSCP and/or the IPv6 flow label. Then, when the IP data packet is mapped to a transmission channel TCID, IP data may be mapped to a corresponding TCID by referring to the mapping relationship between a TCID and a DSCP and/or an IPv6 flow label.

It should be noted that a PDU session may not be considered in the mapping relationship between a DSCP and a TCID or the mapping relationship between a TCID and both a DSCP and an IPv6 flow label included in the QoS short-range control policy of the first node, that is, different PDU sessions may be transmitted on a same TCID.

S408: The second node sends the second information to the first node.

S409: The first node receives the second information from the second node.

S410: The second node sends third information to the first node, where the third information indicates a data routing policy corresponding to the first PDU session.

Specifically, the data routing policy includes session information of the first PDU session.

Optionally, the data routing policy may include one or more types of information, which is not specifically limited to the following four types of information:

Information 1: a number of QoS flows included in the first PDU session.

Information 2: a mapping manner of the first PDU session.

Optionally, when the mapping manner of the first PDU session included in the data routing policy is a mapping relationship between an IP address and a PDU session, the data routing policy may indicate to perform data transmission through a first PDU session established based on an IP address of the first node.

Optionally, when the mapping manner of the first PDU session included in the data routing policy is a mapping relationship between a MAC address and a PDU session, the data routing policy may indicate to perform data transmission through a first PDU session established based on a MAC address of the first node.

Optionally, when the mapping manner of the first PDU session included in the data routing policy is a mapping relationship between a port number and a PDU session, the data routing policy may indicate to perform data transmission through a first PDU session established based on a port number of the first node.

Information 3: a number of first nodes included in the first PDU session.

Information 4: a type of mapping between the QoS flow and the first node.

The type of mapping in embodiments of this application may be a one-to-one mapping, a one-to-many mapping, or a many-to-many mapping.

S411: The first node receives the third information sent by the second node.

S412: The first node and the second node perform, based on the data routing policy, data transmission through the first PDU session.

It should be noted that, in embodiments of this application, when the first node and the second node perform the communication method, the first node and the second node are in a connected state.

It should be understood that, in a method procedure shown in FIG. 4, sequence numbers of the steps do not mean execution sequences. An execution sequence of the processes should be determined based on functions and internal logic of the processes, and should not be construed as any limitation on the implementation processes in embodiments of this application. In addition, the method procedure shown in FIG. 4 is not limited to the foregoing steps. Any addition, deletion, deformation, or the like to the foregoing steps falls within the protection scope of this application.

According to the foregoing method, in embodiments of this application, the third node delivers the second QoS configuration policy based on a requirement of a first node, and the second node configures a PDU session for the first node based on the second QoS configuration policy delivered by the third node, so that a service provided by a core network can better meet a requirement of a terminal that does not support NAS signaling transmission.

Scenario 2: A second node determines a QoS policy corresponding to an established first PDU session.

Figure 5:
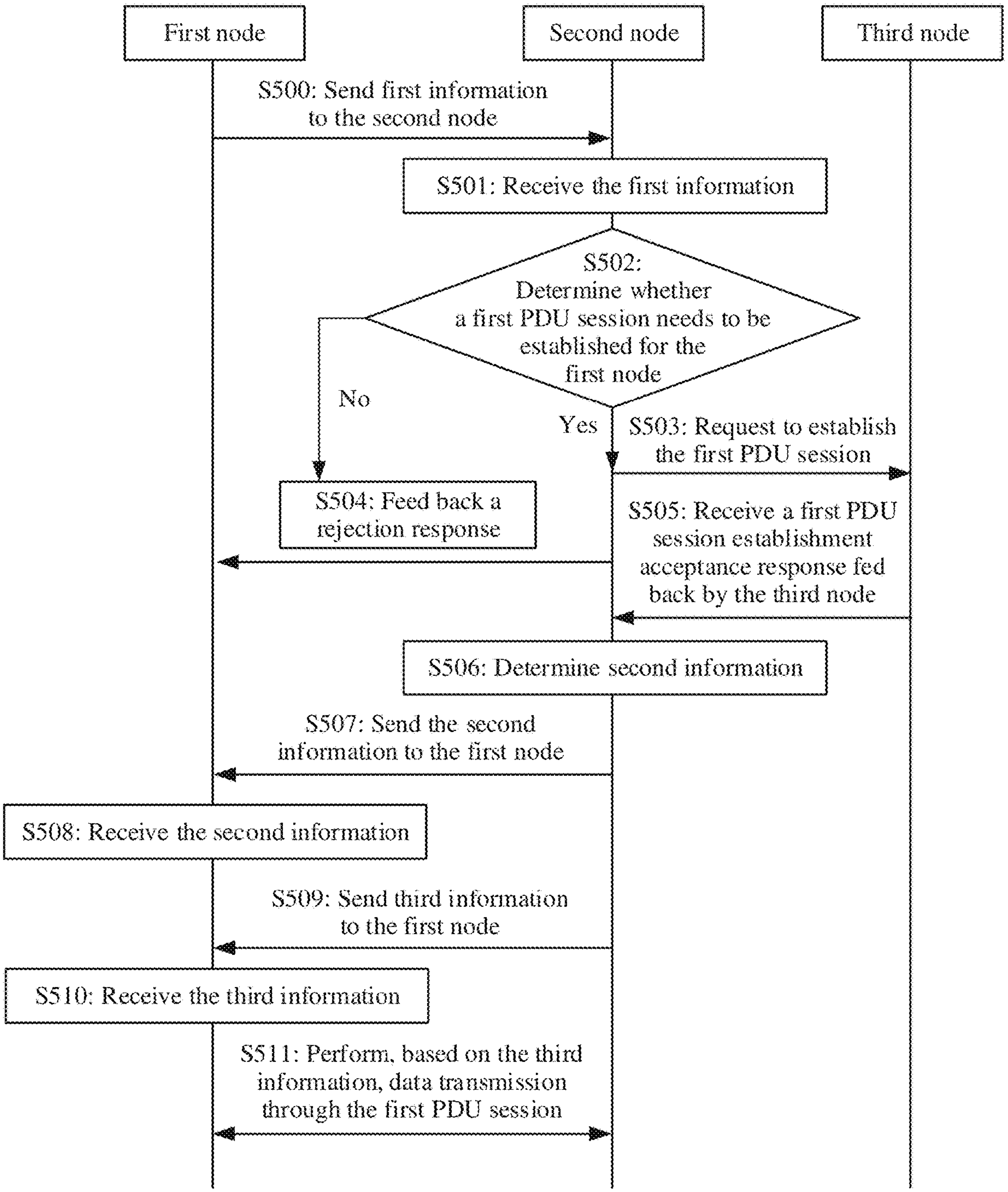
FIG. 5 is a schematic flowchart of an example third communication method according to an embodiment of this application.

As shown in FIG. 5, a method corresponding to the scenario 2 may include the following steps.

S500: A first node sends first information to the second node, where the first information is used to request to establish the first PDU session.

For specific content of S500, refer to descriptions of S300.

S501: The second node receives the first information from the first node.

S502: The second node determines whether the first PDU session needs to be established for the first node, and if the first PDU session needs to be established, performs S503; or if the first PDU session does not need to be established, performs S504.

In S502, the second node may determine, based on the two aspects described in S301, whether to establish the first PDU session for the first node.

S503: The second node requests a third node to establish the first PDU session.

After the second node determines that the first PDU session needs to be established, the second node may convert a related parameter in the first information into a PDU session parameter that can be understood by the third node, and initiate a first PDU session establishment request to the third node.

S504: The second node rejects to establish the first PDU session for the first node, and feeds back a PDU session establishment rejection response to the first node.

S505: The second node receives a first PDU session establishment acceptance response fed back by the third node.

S506: The second node determines second information, where the second information indicates a first QoS configuration policy corresponding to the first PDU session.

In embodiments of this application, the first QoS configuration policy may include one or more mapping relationships, which are not specifically limited to the following three mapping relationships.

Mapping relationship 1: a mapping relationship between a QFI and a DSCP.

Mapping relationship 2: a mapping relationship between a DSCP and an XQI.

Mapping relationship 3: a mapping relationship between an XQI and a QoS parameter.

It should be noted that the XQI in embodiments of this application may be a quality of service identifier of a short-range wireless communication system. For example, the XQI may be understood as a 5QI in a 5G cellular communication system.

Further, the second node may record and maintain a mapping relationship between the first node and the first PDU session.

Further, in embodiments of this application, the second information may indicate a QoS short-range control policy of the first node.

The QoS short-range control policy of the first node may include a mapping relationship between a DSCP and a TCID or a mapping relationship between a TCID and both a DSCP and an IPv6 flow label.

For example, when the first node and the second node perform IP transmission, a priority of an IP data packet may be determined based on the DSCP and/or the IPv6 flow label. Then, when the IP data packet is mapped to a transmission channel TCID, IP data may be mapped to a corresponding TCID by referring to the mapping relationship between a TCID and a DSCP and/or an IPv6 flow label.

It should be noted that a PDU session may not be considered in the mapping relationship between a DSCP and a TCID or the mapping relationship between a TCID and both a DSCP and an IPv6 flow label included in the QoS short-range control policy of the first node, that is, different PDU sessions may be transmitted on a same TCID.

S507: The second node sends the second information to the first node.

S508: The first node receives the second information from the second node.

S509: The second node sends third information to the first node, where the third information indicates a data routing policy corresponding to the first PDU session.

Specifically, the data routing policy includes session information of the first PDU session.

Optionally, the data routing policy may include one or more types of information, which is not specifically limited to the following four types of information:

Information 1: a number of QoS flows included in the first PDU session.

Information 2: a mapping manner of the first PDU session.

Optionally, when the mapping manner of the first PDU session included in the data routing policy is a mapping relationship between an IP address and a PDU session, the data routing policy may indicate to perform data transmission through a first PDU session established based on an IP address of the first node.

Optionally, when the mapping manner of the first PDU session included in the data routing policy is a mapping relationship between a MAC address and a PDU session, the data routing policy may indicate to perform data transmission through a first PDU session established based on a MAC address of the first node.

Optionally, when the mapping manner of the first PDU session included in the data routing policy is a mapping relationship between a port number and a PDU session, the data routing policy may indicate to perform data transmission through a first PDU session established based on a port number of the first node.

Information 3: a number of first nodes included in the first PDU session.

Information 4: a type of mapping between the QoS flow and the first node.

S510: The first node receives the third information sent by the second node.

S511: The first node and the second node perform, based on the data routing policy, data transmission through the first PDU session.

It should be noted that, in embodiments of this application, when the first node and the second node perform the communication method, the first node and the second node are in a connected state.

It should be understood that, in a method procedure shown in FIG. 5, sequence numbers of the steps do not mean execution sequences. An execution sequence of the processes should be determined based on functions and internal logic of the processes, and should not be construed as any limitation on the implementation processes in embodiments of this application. In addition, the method procedure shown in FIG. 5 is not limited to the foregoing steps. Any addition, deletion, deformation, or the like to the foregoing steps falls within the protection scope of this application.

According to the foregoing method, in embodiments of this application, the third node does not need to deliver the QoS policy, so that impact on 3GPP is effectively reduced. In addition, the second node configures the PDU session for the first node based on a static QoS policy, so that a service provided by a core network can better meet a requirement of a terminal that does not support NAS signaling transmission.

Further, in embodiments of this application, a plurality of PDU session pipes may be established between a UPF and a second node, and one PDU session may include data flows of a plurality of first nodes.

In view of this, an embodiment of this application further provides a design manner of a correspondence between a plurality of PDU session and the first node, to determine, based on the correspondence, a first node to which data in the PDU session is sent or a PDU session to which data of the first node is mapped.

The design manner of the correspondence between the PDU session and the first node provided in embodiments of this application is not specifically limited to the following four manners.

Design manner 1: Different first nodes correspond to different IPs, and a mapping relationship between the first node and the PDU session is established based on the IP.

Optionally, in embodiments of this application, the design manner of the correspondence between the PDU session and the first node may be determined based on third information sent by the second node to the first node.

For example, when a data routing policy included in the third information indicates to perform data transmission through a first PDU session established based on an IP address of the first node, the mapping relationship between the first node and the PDU session may be established based on the IP.

The second node establishes a PDU session with a core network, and then the core network allocates an IP address to the second node. The second node may establish an association relationship between the IP address of the first node and the PDU session. When a plurality of first nodes share a same PDU session, data in the PDU session may be shared between the plurality of first nodes. Similarly, data sent by the plurality of first nodes may be carried in the same PDU session and transmitted to the core network. A data packet encapsulated in the PDU session carries the IP address.

Figure 6:
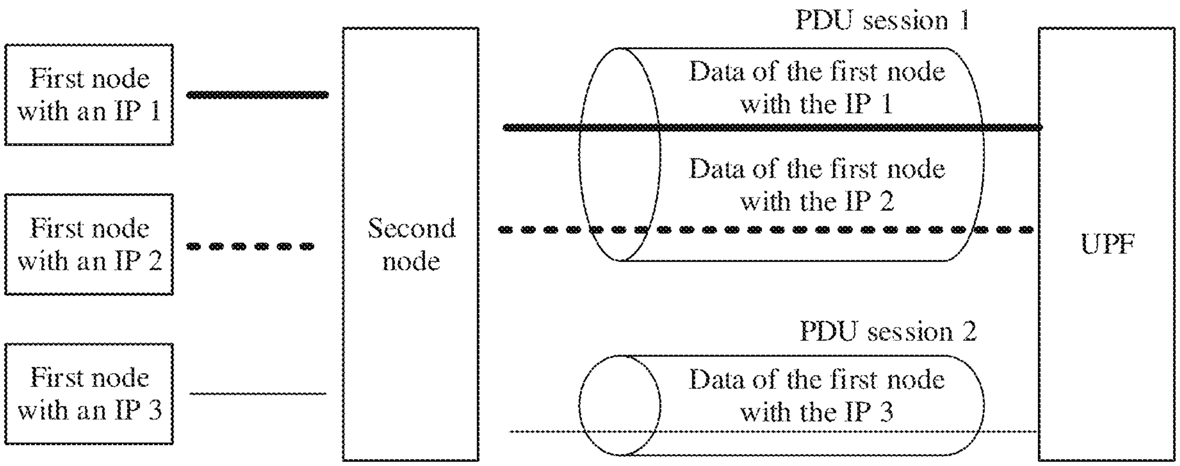
FIG. 6 is a schematic diagram of example first data routing according to an embodiment of this application.

For example, as shown in FIG. 6, a plurality of PDU session pipes may be established between a UPF and the second node. For example, two PDU session pipes are established: a PDU session 1 and a PDU session 2. Each PDU session may include data flows of one or more first nodes. For example, the PDU session 1 includes a data flow of one first node with an IP address 1 and a data flow of one first node with an IP address 2, and the PDU session 2 includes a data flow of one first node with an IP address 3.

A first node to which data in the PDU session is sent or a PDU session to which data of the first node is mapped may be specifically determined based on a mapping relationship between the IP of the first node and the PDU session shown in Table 1.

TABLE 1

Mapping relationship between the IP address of the first node and the PDU session

| IP of the first node | Identifier of the PDU session |
|---|---|
| IP 1 | PDU session 1 |
| IP 2 | |
| IP 3 | PDU session 2 |

It is assumed that the second node needs to determine a PDU session to which data of the first node with an IP 2 is mapped. It may be determined, based on content in Table 1, that the data of the first node with the IP 2 is mapped to the PDU session 1.

Design manner 2: Different first nodes share a same IP address of the second node, and establish a mapping relationship with a PDU session based on a port number.

Optionally, in embodiments of this application, the design manner of the correspondence between the PDU session and the first node may be determined based on third information sent by the second node to the first node.

For example, when a data routing policy included in the third information indicates to perform data transmission through a first PDU session established based on a port number of the first node, the mapping relationship between the first node and the PDU session may be established based on the port number.

The second node establishes a PDU session with a core network, and then the core network allocates a port number to the second node. The second node may establish an association relationship between the port number of the first node and the PDU session. When a plurality of first nodes share a same PDU session, data in the PDU session may be shared between the plurality of first nodes. Similarly, data sent by the plurality of first nodes may be carried in the same PDU session and transmitted to the core network. A data packet encapsulated in the PDU session carries the port number.

Figure 7:
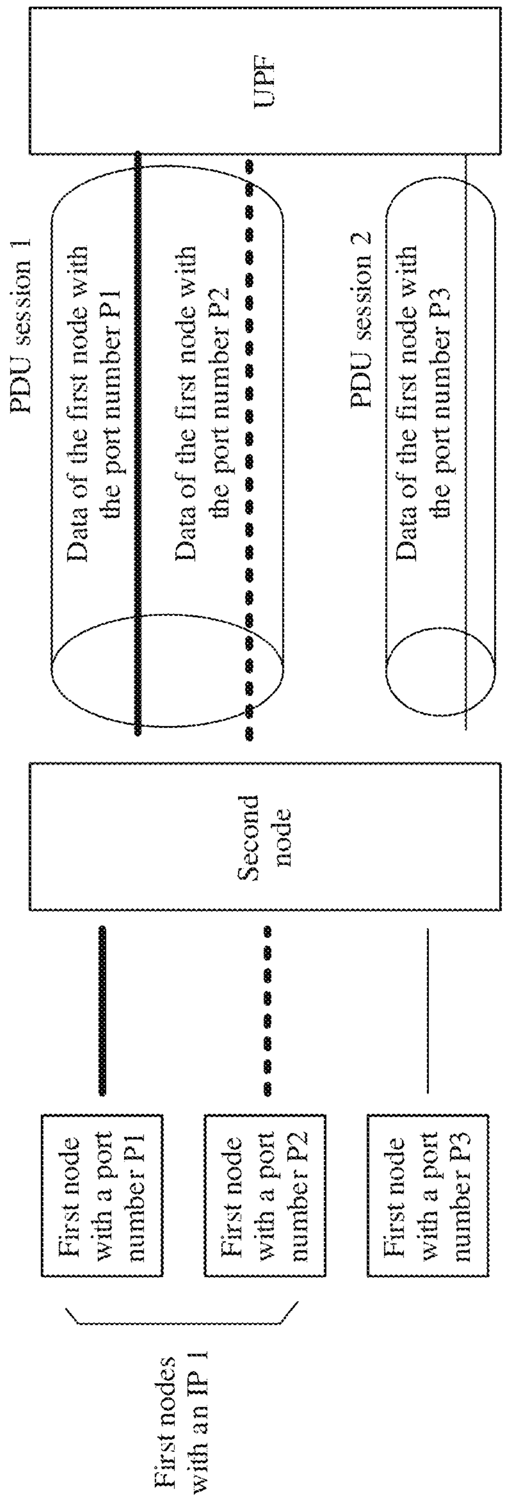
FIG. 7 is a schematic diagram of example second data routing according to an embodiment of this application.

For example, as shown in FIG. 7, a plurality of PDU session pipes may be established between a UPF and the second node. For example, two PDU session pipes are established: a PDU session 1 and a PDU session 2. Each PDU session may include data flows of one or more first nodes. For example, the PDU session 1 includes data flows of two first nodes with an IP 1, where a port number of one first node with an IP 1 is P1, and a port number of another first node with an IP 1 is P2; and the PDU session 2 includes a data flow of a first node with an IP 1 and a port number P3.

A first node to which data in the PDU session is sent or a PDU session to which data of the first node is mapped may be specifically determined based on a mapping relationship between the port number of the first node and the PDU session shown in Table 2.

TABLE 2

Mapping relationship between the port number of the first node and the PDU session

| IP of the first node | Port number of the first node | Identifier of the PDU session |
|---|---|---|
| IP 1 | P1 | PDU session 1 |
| | P2 | |
| IP 1 | P3 | PDU session 2 |

It is assumed that the first node in this application has the IP 1 and the port number P3. The second node may determine, based on content in Table 2, that the data of the first node in this application is mapped to the PDU session 2.

Design manner 3: The second node establishes a mapping relationship with a PDU session based on a MAC address of the first node.

Optionally, in embodiments of this application, the design manner of the correspondence between the PDU session and the first node may be determined based on third information sent by the second node to the first node.

For example, when a data routing policy included in the third information indicates to perform data transmission through a first PDU session established based on a MAC address of the first node, a mapping relationship between the first node and the PDU session may be established based on the MAC address of the first node.

Figure 8:
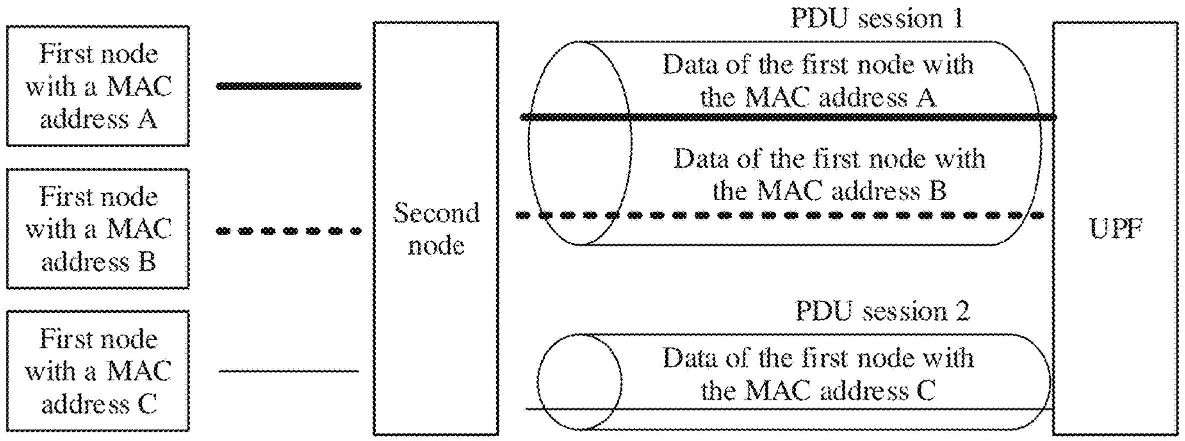
FIG. 8 is a schematic diagram of example third data routing according to an embodiment of this application.

The second node establishes a PDU session with a core network, and then the core network allocates a MAC address to the second node. The second node may establish an association relationship between the MAC address of the first node and the PDU session. When a plurality of first nodes share a same PDU session, data in the PDU session may be shared between the plurality of first nodes. Similarly, data sent by the plurality of first nodes may be carried in the same PDU session and transmitted to the core network. A data packet encapsulated in the PDU session carries the MAC address. For example, as shown in FIG. 8, a plurality of PDU session pipes may be established between a UPF and the second node. For example, two PDU session pipes are established: a PDU session 1 and a PDU session 2. Each PDU session may include data flows of one or more first nodes. For example, the PDU session 1 includes a data flow of a first node with a MAC address A and a data flow of a first node with a MAC address B; and the PDU session 2 includes a data flow of a first node with a MAC address C.

A first node to which data in the PDU session is sent or a PDU session to which data of the first node is mapped may be specifically determined based on a mapping relationship between the MAC address of the first node and the PDU session shown in Table 3.

TABLE 3

Mapping relationship between the MAC address of the first node and the PDU session

| MAC address of the first node | Identifier of the PDU session |
|---|---|
| MAC address A | PDU session 1 |
| MAC address B | |
| MAC address C | PDU session 2 |

It is assumed that the MAC address of the first node in this application is A. The second node may determine, based on content in Table 3, that the data of the first node in this application is mapped to the PDU session 1.

Design manner 4: The second node generates a plurality of temporary MAC addresses, and the second node establishes a mapping relationship with the PDU session based on the temporary MAC address, to finally establish a mapping relationship between the first node and the PDU session.

Optionally, in embodiments of this application, the design manner of the correspondence between the PDU session and the first node may be determined based on third information sent by the second node to the first node.

For example, when a data routing policy included in the third information indicates to perform data transmission through a first PDU session established based on the temporary MAC address of the first node, the mapping relationship between the first node and the PDU session may be established based on the temporary MAC address of the first node.

The second node establishes a PDU session with a core network, and then the core network allocates a temporary MAC address to the second node. The second node may establish an association relationship between the temporary MAC address of the first node and the PDU session. When a plurality of first nodes share a same PDU session, data in the PDU session may be shared between the plurality of first nodes. Similarly, data sent by the plurality of first nodes may be carried in the same PDU session and transmitted to the core network. A data packet encapsulated in the PDU session carries the temporary MAC address.

Figure 9:
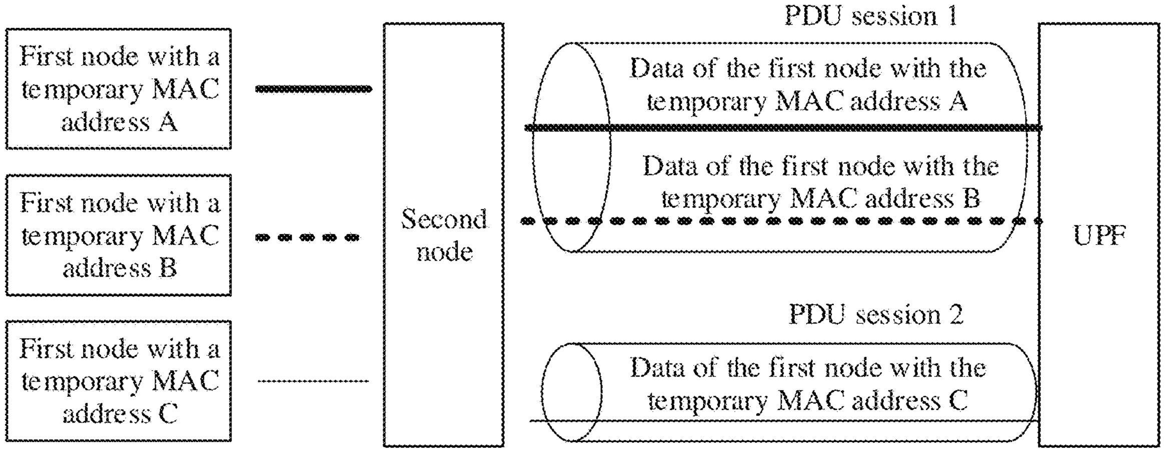
FIG. 9 is a schematic diagram of example fourth data routing according to an embodiment of this application.

For example, as shown in FIG. 9, a plurality of PDU session pipes may be established between a UPF and the second node. For example, two PDU session pipes are established: a PDU session 1 and a PDU session 2. Each PDU session may include data flows of one or more first nodes. For example, the PDU session 1 includes a data flow of a first node with a temporary MAC address A and a data flow of a first node with temporary MAC address B; and the PDU session 2 includes a data flow of a first node with a temporary MAC address C.

A first node to which data in the PDU session is sent or a PDU session to which data of the first node is mapped may be specifically determined based on a mapping relationship between the temporary MAC address of the first node and the PDU session shown in Table 4.

TABLE 4

Mapping relationship between the temporary MAC address of the first node and the PDU session

| Temporary MAC address of the first node | Identifier of the PDU session |
|---|---|
| Temporary MAC address A | PDU session 1 |
| Temporary MAC address B | |
| Temporary MAC address C | PDU session 2 |

It is assumed that the temporary MAC address of the first node in this application is A. The second node may determine, based on content in Table 4, that the data of the first node in this application is mapped to the PDU session 1.

The foregoing correspondence is set, so that a mapping between the first node and the PDU session can be implemented, to better determine a data routing direction.

The method and the apparatus are based on a same technical concept or similar technical concepts. Because problem-resolving principles of the method and the apparatus are similar, mutual reference may be made to implementation of the apparatus and the method, and repeated parts are not described. The terms "system" and "network" may be used interchangeably in embodiments of this application. In descriptions of embodiments of this application, the term "and/or" describes an association relationship between associated objects and indicates that any one of three relationships may exist. For example, A and/or B may indicate any one of three cases: Only A exists, both A and B exist, or only B exists. The character "/" generally indicates an "or" relationship between the associated objects. In this application, "at least one" means one or more, and "a plurality of" means two or more. In addition, it should be understood that, in the description of this application, the terms "first", "second", and "third" are merely intended for distinguishing a purpose of description and shall not to be understood as indication or implication of relative importance, or indication or implication of order. Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized.

Figure 10:
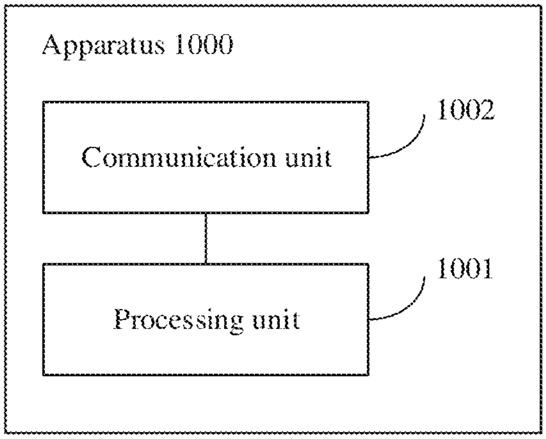
FIG. 10 is a schematic diagram of a structure of an example first communication apparatus according to an embodiment of this application.
Figure 11:
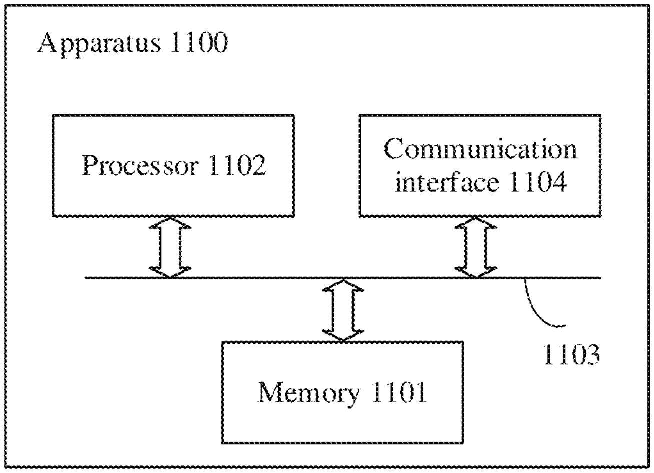
FIG. 11 is a schematic diagram of a structure of a second communication apparatus according to an embodiment of this application.

The following describes in detail apparatuses provided in embodiments of this application with reference to FIG. 10 and FIG. 11. It should be understood that the description of the apparatus embodiments corresponds to the description of the method embodiments. Therefore, for content that is not described in detail, refer to each other.

FIG. 10 is a schematic block diagram of an example apparatus 1000 according to an embodiment of this application. The apparatus is configured to implement a function of the first apparatus or the second apparatus in the foregoing method embodiments. For example, the apparatus may be a software module or a chip system. The chip system may include a chip, or may include a chip and another discrete device. The apparatus 1000 includes a processing unit 1001 and a communication unit 1002. The communication unit 1002 is configured to communicate with another device, and may also be referred to as a communication interface, a transceiver unit, an input/output interface, or the like.

In some embodiments, the apparatus 1000 may be configured to implement the function of the first apparatus in the foregoing methods. The apparatus 1000 may be the first apparatus or a chip, a circuit, or the like configured in the first apparatus. The processing unit 1001 may be configured to perform processing related operations of the first apparatus in the foregoing method embodiments, and the communication unit 1002 is configured to indicate receiving and sending related operations of the first apparatus in the foregoing method embodiments.

For example, the communication unit 1002 is configured to: receive first information from a first node, where the first information is used to request to establish a first protocol data unit (PDU) session; send second information to the first node, where the second information indicates an identifier of the first PDU session and a first quality of service (QoS) configuration policy corresponding to the first PDU session, and the first QoS configuration policy includes a correspondence between the first PDU session and at least one session parameter included in the first information; and send third information to the first node, where the third information indicates a data routing policy corresponding to the first PDU session, and the data routing policy includes session information of the first PDU session.

Optionally, the processing unit 1001 is further configured to:

perform, based on the data routing policy, data transmission through the first PDU session.

Optionally, the first QoS configuration policy includes one or more of the following mapping relationships: a mapping relationship between a service flow identifier QFI and a differentiated service code point (DSCP) of data, a mapping relationship between a DSCP and a quality of service identifier (XQI), or a mapping relationship between an XQI and a QoS parameter.

Optionally, the data routing policy includes one or more of a number of QoS flows included in the first PDU session, a mapping manner of the first PDU session, a number of first nodes included in the first PDU session, or a type of mapping between the QoS flow and the first node.

Optionally, the second information further indicates a QoS short-range control policy of the first node; and the QoS short-range control policy of the first node includes a mapping relationship between a DSCP and a transmission channel identifier TCID or a mapping relationship between a TCID and both a DSCP and an internet protocol version 6 IPv6 flow label.

Optionally, the communication unit 1002 is further configured to receive fourth information from a third node, where the fourth information indicates a second QoS configuration policy of the first PDU session, and the second QoS configuration policy includes a 5G quality of service indicator 5QI, or the second QoS configuration policy indicates a mapping relationship between a 5QI and a QFI.

Optionally, the fourth information is carried in a non-access stratum (NAS) message.

Optionally, before receiving the fourth information from the third node, the communication unit 1002 is further configured to send first request information, where the first request information is used to request the second QoS configuration policy of the first PDU session.

Optionally, the first request information is carried in a registration request sent to the third node; or after sending a registration request to the third node and before receiving the first information, the communication unit 1002 is further configured to send the first request information.

Optionally, the first information includes one or more session parameters of the QoS parameter, an application type, a terminal type, a PSK type, and a DNN; the DNN indicates a type of the first PDU session; and the application type indicates a type of a service that the first PDU session is used to transmit or carry.

Optionally, the processing unit 1001 is further configured to determine that the first node is included in a trustlist of a second node, or determine to establish the first PDU session for the first node.

Optionally, the data routing policy indicates to perform data transmission through a first PDU session established based on an internet protocol IP address of the first node; or the data routing policy indicates to perform data transmission through a first PDU session established based on a media access control MAC address of the first node.

Optionally, the communication unit 1002 communicates with the first node by using a first communication technology and communicates with the third node by using a second communication technology.

In some other embodiments, the apparatus 1000 may be configured to implement the function of the second apparatus in the foregoing method embodiments. The apparatus 1000 may be the second apparatus or a chip, a circuit, or the like configured in the second apparatus. The processing unit 1001 may be configured to perform processing related operations of the second apparatus in the foregoing method embodiments, and the communication unit 1002 is configured to indicate receiving and sending related operations of the second apparatus in the foregoing method embodiments.

For example, the communication unit 1002 is configured to: send first information to a second node, where the first information is used to request to establish a first protocol data unit (PDU) session; receive second information sent by the second node, where the second information indicates an identifier of the first PDU session and a first quality of service (QoS) configuration policy corresponding to the first PDU session, and the first QoS configuration policy includes a correspondence between the first PDU session and at least one session parameter included in the first information; and receive third information sent by the second node, where the third information indicates a data routing policy corresponding to the first PDU session, and the data routing policy includes session information of the first PDU session.

Optionally, the processing unit 1001 is further configured to perform, based on the data routing policy, data transmission through the first PDU session.

Optionally, the first QoS configuration policy includes at least one of the following mapping relationships: a mapping relationship between a service flow identifier QFI and a differentiated service code point (DSCP) of data, a mapping relationship between a DSCP and a quality of service identifier (XQI), or a mapping relationship between an XQI and a QoS parameter.

Optionally, the data routing policy includes one or more of a number of QoS flows included in the first PDU session, a mapping manner of the first PDU session, a number of first nodes included in the first PDU session, or a type of mapping between the QoS flow and the first node.

Optionally, the second information further indicates a QoS short-range control policy of the first node; and the QoS short-range control policy of the first node includes a mapping relationship between a DSCP and a transmission channel identifier TCID or a mapping relationship between a TCID and both a DSCP and an internet protocol version 6 IPv6 flow label.

Optionally, the first information includes one or more session parameters of the QoS parameter, an application type, a terminal type, a PSK type, and a DNN; the DNN indicates a type of the first PDU session; and the application type indicates a type of a service that the first PDU session is used to transmit or carry.

Optionally, the data routing policy indicates to perform data transmission through a first PDU session established based on an internet protocol IP address of the first node; or the data routing policy indicates to perform data transmission through a first PDU session established based on a media access control MAC address of the first node.

Optionally, before the communication unit 1002 sends the first information to the second node, the processing unit 1001 is further configured to determine that no PDU session meets a current service requirement.

Optionally, the communication unit 1002 communicates with the second node by using a first communication technology; and obtains, by using a third node, a service provided by using a second communication technology.

In some other embodiments, the apparatus 1000 may be configured to implement the function of the second apparatus in the foregoing method embodiments. The apparatus 1000 may be the second apparatus or a chip, a circuit, or the like configured in the second apparatus. The processing unit 1001 may be configured to perform processing related operations of the second apparatus in the foregoing method embodiments, and the communication unit 1002 is configured to indicate receiving and sending related operations of the second apparatus in the foregoing method embodiments.

For example, the communication unit 1002 is configured to send fourth information to a second node, where the fourth information indicates a second quality of service QoS configuration policy of a first PDU session, and the second QoS configuration policy includes a 5G quality of service indicator 5QI, or the second QoS configuration policy indicates a mapping relationship between a 5QI and a service flow identifier QFI.

Optionally, the fourth information is carried in a NAS message.

Optionally, before sending the fourth information to the second node, the communication unit 1002 is further configured to receive first request information, where the first request information is used to request the second QoS configuration policy of the first PDU session.

Optionally, the first request information is carried in a registration request received from the second node, or the first request information is obtained after a registration request is received from the second node.

Optionally, the communication unit 1002 communicates with the second node by using a second communication technology, and the communication unit 1002 provides, by using the second communication technology, a service for a first node that uses a first communication technology.

In embodiments of this application, division into the units is an example, and is merely a logical function division. In actual implementation, another division manner may be used. In addition, functional units in embodiments of this application may be integrated into one processor, or each of the units may exist alone physically, or two or more units are integrated into one unit. The integrated unit may be implemented in a form of hardware, or may be implemented in a form of a software functional unit.

FIG. 11 is a schematic diagram of an example apparatus 1100 according to an embodiment of this application. The apparatus 1100 may be a node, or a component in a node, for example, a chip or an integrated circuit. The apparatus 1100 may include at least one processor 1102 and a communication interface 1104. Further, optionally, the apparatus may include at least one memory 1101. Further, optionally, a bus 1103 may be included. The memory 1101, the processor 1102, and the communication interface 1104 are connected through the bus 1103.

The memory 1101 is configured to provide storage space, and the storage space may store data such as an operating system and a computer program. The memory 1101 mentioned in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

It should be noted that the memory described in this application is intended to include but is not limited to these memories and any memory of another proper type. The processor 1102 is a module for performing an arithmetic operation and/or a logical operation, and may be specifically one or a combination of a plurality of processing modules such as a central processing unit (CPU), a graphics processing unit (GPU), a microprocessor unit (MPU), an application-specific integrated circuit (ASIC), a field programmable gate array (FPGA), a complex programmable logic device (CPLD), a synergistic processing unit (assisting the central processing unit in completing corresponding processing and application), and a microcontroller unit (MCU).

It should be noted that when the processor is a general-purpose processor, an ASIC, an FPGA or another programmable logic device, a discrete gate or a transistor logic device, or a discrete hardware component, the memory (storage module) may be integrated into the processor.

The communication interface 1104 may be configured to provide an information input or output for the at least one processor. And/or, the communication interface may be configured to receive data sent from an outside and/or send data to the outside, and may be a wired link interface including an Ethernet cable and the like, or may be a wireless link (Wi-Fi, Bluetooth, universal wireless transmission, an in-vehicle short-range communication technology, or the like) interface. Optionally, the communication interface 1104 may further include a transmitter (for example, a radio frequency transmitter or an antenna), a receiver, or the like that is coupled to the interface.

In some embodiments, the apparatus 1100 may be the first apparatus in the foregoing method embodiments or a component in the first apparatus, for example, a chip or an integrated circuit. The processor 1102 in the apparatus 1100 is configured to read the computer program stored in the memory 1101, to control the first apparatus to perform following operations: receiving first information from a first node, where the first information is used to request to establish a first protocol data unit (PDU) session; sending second information to the first node, where the second information indicates an identifier of the first PDU session and a first quality of service QoS configuration policy corresponding to the first PDU session, and the first QoS configuration policy includes a correspondence between the first PDU session and at least one session parameter included in the first information; and sending third information to the first node, where the third information indicates a data routing policy corresponding to the first PDU session, and the data routing policy includes session information of the first PDU session.

Optionally, the processor 1102 in the first apparatus may be further configured to: read a program in the memory 1101, and perform the method procedure performed by the first node in S300 to S306 shown in FIG. 3, or perform the method procedure performed by the first node in S400 to S412 shown in FIG. 4, or perform the method procedure performed by the first node in S500 to S511 shown in FIG. 5.

For specific details, refer to the descriptions in the foregoing method embodiments, and details are not described again.

In some other embodiments, the apparatus 1100 may be the second apparatus in the foregoing method embodiments or a component in the second apparatus, for example, a chip or an integrated circuit. The processor 1102 in the apparatus 1100 is configured to read the computer program stored in the memory 1101, to control the second apparatus to perform following operations:

sending first information to a second node, where the first information is used to request to establish a first protocol data unit (PDU) session; receiving second information sent by the second node, where the second information indicates an identifier of the first PDU session and a first quality of service (QoS) configuration policy corresponding to the first PDU session, and the first QoS configuration policy includes a correspondence between the first PDU session and at least one session parameter included in the first information; and receiving third information sent by the second node, where the third information indicates a data routing policy corresponding to the first PDU session, and the data routing policy includes session information of the first PDU session.

Optionally, the processor 1102 in the second apparatus may be further configured to: read a program in the memory 1101, and perform the method procedure performed by the second node in S300 to S306 shown in FIG. 3, or perform the method procedure performed by the second node in S400 to S412 shown in FIG. 4, or perform the method procedure performed by the second node in S500 to S511 shown in FIG. 5.

For specific details, refer to the descriptions in the foregoing method embodiments, and details are not described again.

In some other embodiments, the apparatus 1100 may be the third apparatus in the foregoing method embodiments or a component in the third apparatus, for example, a chip or an integrated circuit. The processor 1102 in the apparatus 1100 is configured to read the computer program stored in the memory 1101, to control the second apparatus to perform following operations:

sending fourth information to a second node, where the fourth information indicates a second quality of service QoS configuration policy of a first PDU session, and the second QoS configuration policy includes a 5G quality of service indicator 5QI, or the second QoS configuration policy indicates a mapping relationship between a 5QI and a service flow identifier QFI.

Optionally, the processor 1102 in the second apparatus may be further configured to: read a program in the memory 1101, and perform the method procedure performed by the second node in S300 to S306 shown in FIG. 3, or perform the method procedure performed by the second node in S400 to S412 shown in FIG. 4, or perform the method procedure performed by the second node in S500 to S511 shown in FIG. 5.

For specific details, refer to the descriptions in the foregoing method embodiments, and details are not described again.

An embodiment of this application further provides a terminal. The terminal may be an intelligent terminal with a short-range communication function, for example, a smartphone, a notebook computer, a tablet computer, a mouse, a keyboard, a headset, a stereo, or a vehicle-mounted playback device. The terminal includes a first apparatus and/or a second apparatus, and the first apparatus and the second apparatus may be respectively the first node and the second node in the embodiment shown in FIG. 3. Types of the first apparatus and the second apparatus may be the same or different.

Figure 12:
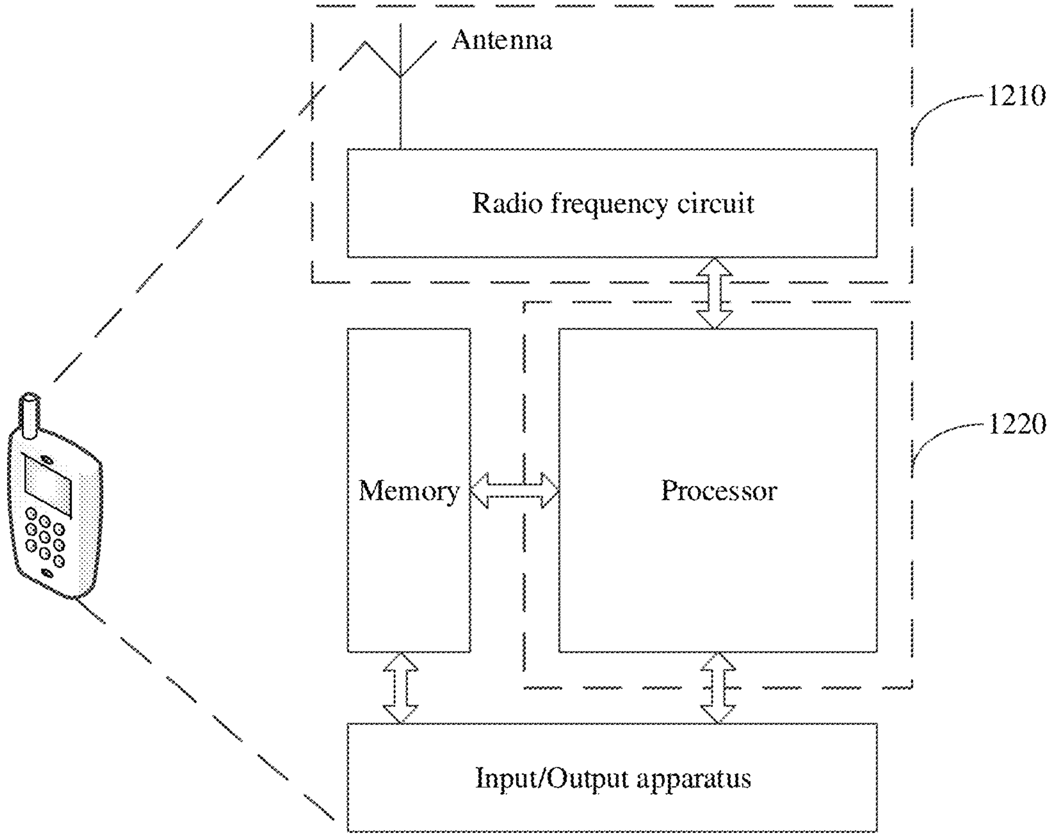
FIG. 12 is a schematic diagram of a structure of an example terminal according to an embodiment of this application.

FIG. 12 is a schematic diagram of a simplified structure of an example terminal device. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to: receive and send a radio frequency signal in a form of an electromagnetic wave. The input/output apparatus, for example, a touchscreen, a display, or a keyboard, is mainly configured to: receive data input by a user and output data to the user. It should be noted that some types of terminal devices may have no input/output apparatus.

When needing to send data, after performing baseband processing on to-be-sent data, the processor outputs a baseband signal to the radio frequency circuit; and the radio frequency circuit performs radio frequency processing on the baseband signal and then sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in embodiments of this application.

In embodiments of this application, the antenna and the radio frequency circuit that have receiving and sending functions may be considered as a transceiver unit of the terminal device, and the processor that has a processing function may be considered as a processing unit of the terminal device. As shown in FIG. 12, the terminal device includes a transceiver unit 1210 and a processing unit 1220. The transceiver unit may also be referred to as a transceiver, a transceiver machine, a transceiver apparatus, or the like. The processing unit may also be referred to as a processor, a processing board, a processing module, a processing apparatus, or the like. Optionally, a device that is in the transceiver unit 1210 and that is configured to implement a receiving function may be considered as a receiving unit, and a device that is in the transceiver unit 1210 and that is configured to implement a sending function may be considered as a sending unit. In other words, the transceiver unit 1210 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1210 is configured to perform sending and receiving operations of the first node side in the method embodiment shown in FIG. 3, and the processing unit 1220 is configured to perform another operation of the first node side in the method embodiment shown in FIG. 3 other than the sending and receiving operations.

For example, in an implementation, the transceiver unit 1210 is configured to perform receiving and sending steps of the first node in the embodiment shown in FIG. 3, for example, S300, and/or support another process of the technology described in this specification. The processing unit 1220 is configured to perform an operation on the terminal device side in the embodiment shown in FIG. 3 other than the sending and receiving operations, for example, S306, and/or configured to support another process of the technology described in this specification.

Alternatively, the transceiver unit 1210 is configured to perform sending and receiving operations of the first node in the method embodiment shown in FIG. 4, and the processing unit 1220 is configured to perform an operation of the first node side in the method embodiment shown in FIG. 4 other than the sending and receiving operations.

For example, in an implementation, the transceiver unit 1210 is configured to perform receiving and sending steps of the first node in the embodiment shown in FIG. 4, for example, S401, and/or support another process of the technology described in this specification. The processing unit 1220 is configured to perform an operation on the first node side in the embodiment shown in FIG. 4 other than the sending and receiving operations, for example, S412, and/or configured to support another process of the technology described in this specification.

Alternatively, the transceiver unit 1210 is configured to perform sending and receiving operations of the first node side in the method embodiment shown in FIG. 5, and the processing unit 1220 is configured to perform an operation of the first node side in the method embodiment shown in FIG. 5 other than the sending and receiving operations.

For example, in an implementation, the transceiver unit 1210 is configured to perform receiving and sending steps of the first node side in the embodiment shown in FIG. 5, for example, S500, and/or support another process of the technology described in this specification. The processing unit 1220 is configured to perform an operation on the first node side in the embodiment shown in FIG. 5 other than the sending and receiving operations, for example, S511, and/or configured to support another process of the technology described in this specification.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

An embodiment of this application further provides a computer-readable storage medium, including instructions. When the instructions are run on a computer, the computer is enabled to perform the method described in the foregoing embodiments.

An embodiment of this application further provides a chip system. The chip system includes at least one processor and an interface circuit. Further, optionally, the chip system may include a memory or an external memory. The processor is configured to execute instructions and/or data interaction through the interface circuit, to implement the method in the foregoing method embodiments. The chip system may include a chip, or may include a chip and another discrete device.

An embodiment of this application further provides a computer program product, including instructions. When the instructions are run on a computer, the computer is enabled to perform the method described in the foregoing embodiments.

In embodiments of this application, the processor may be a general-purpose processor, a digital signal processor, an application-specific integrated circuit, a field programmable gate array or another programmable logic device, a discrete gate or transistor logic device, a discrete hardware component, or a synergistic processing unit, and may implement or execute the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware in the processor and a software module.

In embodiments of this application, the memory may be a non-volatile memory, for example, a hard disk drive (HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store program instructions and/or data.

All or some of the methods in embodiments of this application may be implemented through software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (briefly referred to as DSL)) or wireless (for example, infrared, radio, or microwave) manner. The computer-readable storage medium may be any usable medium accessible by the computer, or a data storage device such as a server or a data center, integrating one or more usable media. The usable medium may be a magnetic medium (for example, a floppy disk, a hard disk drive, or a magnetic tape), an optical medium (for example, a digital video disc (briefly referred to as DVD)), a semiconductor medium (for example, an SSD), or the like.

A person of ordinary skill in the art may be aware that the units and algorithm steps described with reference to the examples in embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

When the functions are implemented in the form of a software functional unit and sold or used as an independent product, the functions may be stored in a computer-readable storage medium. Based on such an understanding, the technical solutions in this application essentially, the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code, for example, a USB flash drive, a removable hard disk, a read-only memory (ROM), a random access memory (RAM), a magnetic disk, or an optical disc.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An apparatus comprising:

at least one processor; and at least one memory, coupled to the at least one processor, and storing programming instructions that, when executed by the at least one processor, cause the apparatus to:

receive from a first node first information for requesting to establish a first protocol data unit (PDU) session;

send second information to the first node, wherein the second information indicates an identifier of the first PDU session and a first quality of service (QoS) configuration policy corresponding to the first PDU session, wherein the first QoS configuration policy comprises at least one of a mapping relationship between a service flow identifier (QFI) and a differentiated service code point (DSCP) of data, a mapping relationship between the DSCP and a quality of service identifier (XQI), or a mapping relationship between an XQI and a QoS parameter; and send third information to the first node, wherein the third information indicates a data routing policy corresponding to the first PDU session, and the data routing policy comprises session information of the first PDU session.

2. The apparatus according to claim 1, wherein the programming instructions, when executed by the at least one processor, further cause the apparatus to:

perform, based on the data routing policy, data transmission through the first PDU session.

3. The apparatus according to claim 1, wherein the data routing policy comprises at least one of a number of QoS flows comprised in the first PDU session, a mapping manner of the first PDU session, a number of first nodes comprised in the first PDU session, or a type of mapping between a QoS flow and the first node.

4. The apparatus according to claim 1, wherein the second information further indicates a QoS short-range control policy of the first node; and the QoS short-range control policy of the first node comprises a mapping relationship between a differentiated service code point (DSCP) and a transmission channel identifier (TCID) or a mapping relationship between the TCID and both the DSCP and an internet protocol version 6 (IPv6) flow label.

5. The apparatus according to claim 1, wherein the programming instructions, when executed by the at least one processor, further cause the apparatus to:

receive fourth information from a third node, wherein the fourth information indicates a second QoS configuration policy of the first PDU session, and the second QoS configuration policy comprises a 5G quality of service indicator (5QI), or the second QoS configuration policy indicates a mapping relationship between a 5QI and a QFI.

6. The apparatus according to claim 5, wherein the fourth information is carried in a non-access stratum (NAS) message.

7. The apparatus according to claim 5, wherein the programming instructions, when executed by the at least one processor, further cause the apparatus to:

before receiving the fourth information from a third node, send first request information for requesting the second QoS configuration policy of the first PDU session.

8. The apparatus according to claim 7, wherein the first request information is carried in a registration request sent to the third node; or the instructions, when executed by the at least one processor, further cause the apparatus to: after a registration request is sent to the third node and before the first information is received, send the first request information.

9. An apparatus comprising:

at least one processor; and at least one memory, coupled to the at least one processor, and storing programming instructions that, when executed by the at least one processor, cause the apparatus to:

send first information to a second node, wherein the first information is used to request to establish a first protocol data unit (PDU) session;

receive second information sent by the second node, wherein the second information indicates an identifier of the first PDU session and a first quality of service (QoS) configuration policy corresponding to the first PDU session, wherein the first QoS configuration policy comprises at least one of a mapping relationship between a service flow identifier (QFI) and a differentiated service code point (DSCP) of data, a mapping relationship between the DSCP and a quality of service identifier (XQI), or a mapping relationship between an XQI and a QoS parameter; and receive third information sent by the second node, wherein the third information indicates a data routing policy corresponding to the first PDU session, and the data routing policy comprises session information of the first PDU session.

10. The apparatus according to claim 9, wherein the programming instructions, when executed by the at least one processor, further cause the apparatus to:

perform, based on the data routing policy, data transmission through the first PDU session.

11. The apparatus according to claim 9, wherein the data routing policy comprises at least one of a number of QoS flows comprised in the first PDU session, a mapping manner of the first PDU session, a number of first nodes comprised in the first PDU session, or a type of mapping between a QoS flow and the first node.

12. The apparatus according to claim 9, wherein the second information further indicates a QoS short-range control policy of a first node; and the QoS short-range control policy of the first node comprises a mapping relationship between a differentiated service code point (DSCP) and a transmission channel identifier (TCID) or a mapping relationship between the TCID and both the DSCP and an internet protocol version 6 (IPv6) flow label.

13. The apparatus according to claim 9, wherein the first information comprises at least one of the QoS parameter, an application type, a terminal type, a pre-shared key (PSK) type, or a data network name (DNN);

the DNN indicates a type of the first PDU session; and the application type indicates a type of a service that the first PDU session is used to transmit or carry.

14. An apparatus comprising:

at least one processor; and at least one memory, coupled to the at least one processor, and storing programming instructions that, when executed by the at least one processor, cause the apparatus to:

send fourth information to a second node, wherein the fourth information indicates a second quality of service (QoS) configuration policy of a first protocol data unit (PDU), session, and the second QoS configuration policy comprises a 5G quality of service indicator (5QI), and wherein the second QoS configuration policy indicates a mapping relationship between the 5QI and another session parameter of the first PDU session.

15. The apparatus according to claim 14, wherein the fourth information is carried in a non-access stratum (NAS) message.

16. The apparatus according to claim 14, wherein the programming instructions, when executed by the at least one processor, further cause the apparatus to:

before sending the fourth information to the second node, receive first request information for requesting the second QoS configuration policy of the first PDU session.

17. The apparatus according to claim 16, wherein the first request information is carried in a registration request received from the second node, or the first request information is obtained after a registration request is received from the second node.

18. The apparatus according to claim 14, wherein communication with the second node is performed by using a second communication technology; and a service is provided, by using the second communication technology, for a first node that uses a first communication technology.

* * * * *